(12) United States Patent
Li et al.

(10) Patent No.: US 10,519,602 B2
(45) Date of Patent: Dec. 31, 2019

(54) POLYMER FOR PITCH AND STICKIES DEPOSITION CONTROL IN PAPERMAKING

(71) Applicant: Ecolab USA Inc., St. Paul, MN (US)

(72) Inventors: Xiaojin Harry Li, Palatine, IL (US); Sergey M. Shevchenko, Aurora, IL (US); Ross Gray, Plainfield, IL (US); Robert M. Lowe, Chicago, IL (US); David Jordan, Evanston, IL (US); Zhengang Zong, Aurora, IL (US)

(73) Assignee: Ecolab USA Inc., St. Paul, MN (US)

( * ) Notice: Subject to any disclaimer, the term of this patent is extended or adjusted under 35 U.S.C. 154(b) by 14 days.

(21) Appl. No.: 16/008,589

(22) Filed: Jun. 14, 2018

(65) Prior Publication Data

US 2018/0363247 A1 Dec. 20, 2018

Related U.S. Application Data

(60) Provisional application No. 62/520,161, filed on Jun. 15, 2017.

(51) Int. Cl.

| D21H 21/02 | (2006.01) |
| D21H 17/37 | (2006.01) |
| C08F 220/22 | (2006.01) |
| C08F 220/56 | (2006.01) |
| C08F 220/60 | (2006.01) |
| C08F 226/04 | (2006.01) |
| D21H 21/18 | (2006.01) |
| D21H 23/14 | (2006.01) |
| D21H 17/34 | (2006.01) |
| D21H 17/45 | (2006.01) |
| D21H 21/04 | (2006.01) |

(52) U.S. Cl.
CPC ......... *D21H 17/375* (2013.01); *C08F 220/22* (2013.01); *C08F 220/56* (2013.01); *C08F 220/60* (2013.01); *C08F 226/04* (2013.01); *D21H 17/34* (2013.01); *D21H 17/45* (2013.01); *D21H 21/02* (2013.01); *D21H 21/04* (2013.01); *D21H 21/18* (2013.01); *D21H 23/14* (2013.01)

(58) Field of Classification Search
USPC .................................................... 162/168.3
See application file for complete search history.

(56) References Cited

U.S. PATENT DOCUMENTS

| 3,865,686 A | 2/1975 | Jursich et al. |
| 4,313,790 A | 2/1982 | Pelton et al. |
| 4,387,017 A | 6/1983 | McEntire et al. |
| 5,246,547 A | 9/1993 | Finck et al. |
| 5,393,380 A | 2/1995 | Reed et al. |
| 5,597,448 A | 1/1997 | Reed et al. |
| 5,679,261 A | 10/1997 | Sivakumar et al. |
| 5,989,392 A | 12/1999 | Tang et al. |
| 6,554,869 B2 | 4/2003 | Aubay et al. |
| 6,942,782 B2 | 9/2005 | Shevchenko et al. |
| 7,449,086 B2 | 11/2008 | Gray et al. |
| 7,482,417 B2 | 1/2009 | Kiyosada et al. |
| 7,858,722 B2 | 12/2010 | Liu et al. |
| 7,862,688 B2 | 1/2011 | Thomas |
| 8,048,268 B2 | 11/2011 | Jiang et al. |
| 8,500,957 B2 | 8/2013 | Shevchenko et al. |
| 8,657,996 B2 | 2/2014 | Zhou et al. |
| 8,808,678 B2 | 8/2014 | Sherry |
| 2008/0234432 A1 | 9/2008 | Liu et al. |
| 2008/0251106 A1 | 10/2008 | Scialla et al. |
| 2009/0304620 A1 | 12/2009 | Schulze zur Wiesche et al. |
| 2012/0043040 A1 | 2/2012 | Zhang et al. |
| 2013/0340964 A1 | 12/2013 | Li et al. |
| 2015/0053358 A1 | 2/2015 | Ban et al. |
| 2016/0082412 A1 | 3/2016 | Eylem et al. |
| 2016/0355980 A1 | 12/2016 | Kien et al. |

FOREIGN PATENT DOCUMENTS

| CA | 2102143 A1 | 5/1994 |
| EP | 0058621 A1 | 8/1982 |
| EP | 0058622 A1 | 8/1982 |
| EP | 0444788 A1 | 9/1991 |
| EP | 0464993 B1 | 2/1995 |
| EP | 0760406 A2 | 3/1997 |
| EP | 2035621 B1 | 6/2010 |
| EP | 2092114 B1 | 4/2011 |

OTHER PUBLICATIONS

European Patent Office, International Search Report in International Patent Application No. PCT/US2018/037532, 4 pp. (dated Sep. 28, 2018).
European Patent Office, International Search Report in International Patent Application No. PCT/US2018/037532, 5 pp. (dated Sep. 28, 2018).
Batelka, "The comparative response of Ring Crush Test and STFI Short Span Crush Test to paper mill process variable changes," *Corrugating International*, 2(4), pp. 163-169 (2000).
ISO, "Paper and board—Determination of compressive strength—Ring crush method," International Standard No. 12192:2011(E), 18 pp. (2011).
Losada et al., "Copolymerization of a Cationic Double-Charged Monomer and Electrochemical Properties of the Copolymers," *Macromolecules*, 42, pp. 3285-3293 (2009).
Shevchenko et al., "Novel concepts for monitoring and control of deposits in pulp and paper mills," *Appita Journal*, 64, pp. 25-29 (2011).
TAPPI, "Ring crush of paperboard (rigid support method)," TAPPI Standard No. T 822 om-02, 5 pp. (2002).
TAPPI, "Short span compressive strength," TAPPI Standard No. T 826, 3 pp. (2018).

*Primary Examiner* — Mark Halpern

(74) *Attorney, Agent, or Firm* — Leydig Voit and Mayer, Ltd.

(57) ABSTRACT

An acrylamide-based polymer which contains one or more multiquaternized ("multiquat") monomer unit(s) is provided. The acrylamide-based polymer can be used in a papermaking process to reduce pitch and stickies deposition, improve retention and drainage, and enhance dry strength properties of paper. Also included is a method of controlling pitch and stickies deposition in papermaking comprising treating pulp slurry with an acrylamide-based polymer which contains one or more multiquaternized ("multiquat") monomer unit(s).

20 Claims, 6 Drawing Sheets

POLYMER FOR PITCH AND STICKIES DEPOSITION CONTROL IN PAPERMAKING

This application is a nonprovisional application claiming the benefit of U.S. Provisional Patent Application Ser. No. 62/520,161, filed Jun. 15, 2017, the disclosure of which is incorporated herein by reference in its entirety.

BACKGROUND OF THE INVENTION

The deposition of organic contaminants on process equipment, screens, and containment vessels in papermaking can reduce process efficiency and paper quality. Deposits on machine wires, felts, foils, headbox surfaces, screens, and instruments can result in downtime for cleaning to avoid the problems associated with poor process control, reduced throughput, and substandard sheet properties. Such contaminants are generically referred to in the paper industry as either "pitch" or "stickies." As used herein, "pitch" generally refers to tacky materials containing resins derived from wood fibers. As used herein, "stickies" generally refers to tacky materials derived from recycled paper products (e.g., printing inks or pressure sensitive adhesives). Such substances can form deposits when reintroduced in recycled fiber systems. Pitch and stickies may also contain entrapped inorganic materials such as talc, calcium carbonate, or titanium dioxide.

Recycled fiber refers to secondary fibers that are repulped to provide the papermaking furnish with raw material for the production of new paper. The secondary fibers may be either pre-consumer or post-consumer paper material that is suitable for use in the production of paper products. Sources of secondary fiber may include old newspaper ("ONP"), old corrugated cardboard ("OCC"), mixed office waste ("MOW"), computer printout ("CPO"), ledger, etc. These once-processed papers contain various types of adhesives (e.g., pressure sensitive, hot melts, etc.), inks, and coating binders.

Pitch and stickies are each hydrophobic in nature and thus unstable as colloids in aqueous papermaking environments, thereby facilitating their deposition onto surfaces of the paper machine. Problems that may arise from deposition are as follows: (1) reduced throughput due to plugging of forming fabrics and press felts, (2) sheet holes or paper breaks due to large deposits breaking loose from the equipment, and (3) reduced sheet quality due to large particle contaminants incorporated in the final sheet.

Surfactant additives can be used to disperse pitch and stickies, but current products have limitations. For example, cationic polymer dispersants can be attracted to fiber surfaces, which may reduce their effectiveness, and they may further interfere with charge dynamics of the fibers, which may decrease the effectiveness of other additives such as strength agents. Anionic polymer dispersants may cause precipitation of wet strength agents or inorganic components. Nonionic surfactants such as nonylphenol ethoxylates may cause foaming, which can upset the system. Accordingly, improved methodologies for controlling contaminant deposition in the papermaking process are needed.

BRIEF SUMMARY OF THE INVENTION

A polymer for use in papermaking comprising one or more monomer unit(s) of formula I:

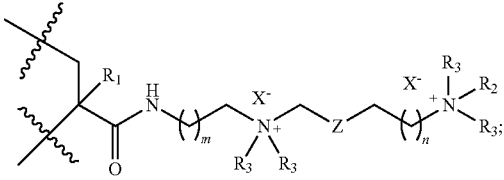

one or more monomer unit(s) of formula II:

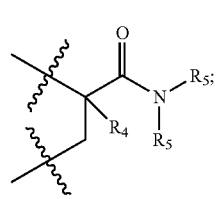

one or more additional monomer unit(s) selected from 2-(dimethylamino)ethyl acrylate ("DMAEA"), 2-(dimethylamino)ethyl methacrylate ("DMAEM"), 3-(dimethylamino) propyl methacrylamide ("DMAPMA"), 3-(dimethylamino) propyl acrylamide ("DMAPA"), 3-methacrylamidopropyl-trimethyl-ammonium chloride ("MAPTAC"), 3-acrylamidopropyl-trimethyl-ammonium chloride ("APTAC"), N-vinyl pyrrolidone ("NVP"), diallyldimethylammonium chloride ("DADMAC"), diallylamine, vinylformamide, 2-(acryloyloxy)-N,N,N-trimethylethanaminium chloride ("DMAEA.MCQ"), 2-(methacryloyloxy)-N,N,N-trimethylethanaminium chloride ("DMAEM.MCQ"), N,N-dimethylaminoethyl acrylate benzyl chloride ("DMAEA.BCQ"), N,N-dimethylaminoethyl methacrylate benzyl chloride ("DMAEM.BCQ"), 2-acrylamido-2-methylpropane sulfonic acid ("AMPS"), 2-acrylamido-2-methylbutane sulfonic acid ("AMBS"), [2-methyl-2-[(1-oxo-2-propenyl)amino]propyl]-phosphonic acid, (meth)acrylic acid; and one or more monomer unit(s) of formula III:

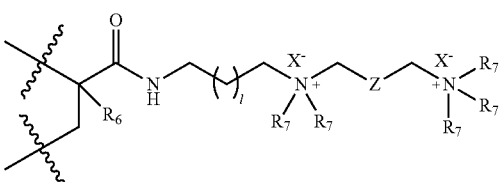

is provided.

A method to reduce pitch and stickies deposition, improve retention and drainage, and enhance dry strength properties of paper, such as tensile strength, STFI index, ring crush index, and burst index by treating paper slurry with the polymer during a papermaking process is also provided. The method comprises treating pulp slurry with a polymer described above and herein.

DETAILED DESCRIPTION OF THE INVENTION

Figure 1:
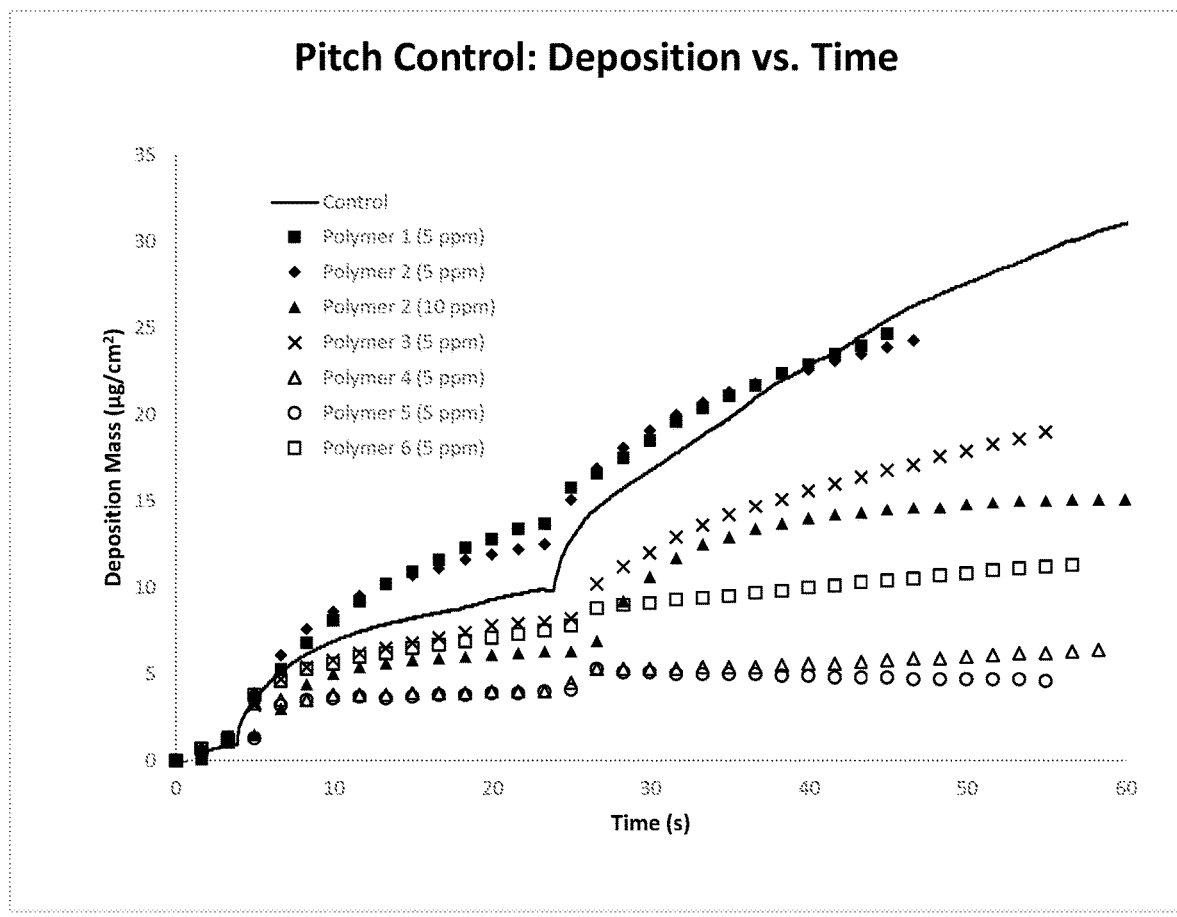
FIG. 1 illustrates pitch deposition as a function of time for Example 1.

An acrylamide-based polymer comprising one or more multiquaternized ("multiquat") acrylamide-based monomer unit(s) is provided. As used herein, "multiquanternized" or "multiquat" refers to a monomer which comprises at least two quaternary amine centers, for example, two, three, four, five, six, or more quaternary amine centers. In some embodiments of the polymer, the polymer can be used in a papermaking process to reduce pitch and stickies deposition, improve retention and drainage, and/or enhance dry strength properties of paper, such as tensile strength, STFI index, ring crush index, and burst index.

The polymer comprises one or more monomer unit(s) of formula I:

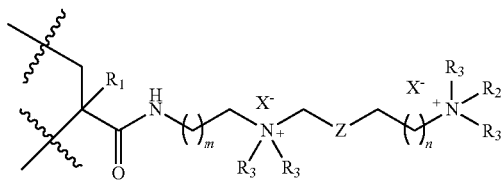

I wherein each X can be the same or different and is independently selected from an anion, $R_1$ is hydrogen or $C_1$-$C_9$ alkyl, $R_2$ is an aliphatic chain or a heteroaliphatic chain from about 10 to about 30 carbon units in length, each $R_3$ can be the same or different and is independently selected from hydrogen, aryl, $C_1$-$C_9$ alkyl, and a combination thereof, Z is $CH_2$, CHOH, CHOR, or a combination thereof, wherein R is a substituent with one or more quanternized amine(s), m is an integer from 0 to 11 (i.e., 0, 1, 2, 3, 4, 5, 6, 7, 8, 9, 10, or 11), and n is an integer from 0 to 5 (i.e., 0, 1, 2, 3, 4, or 5).

In certain embodiments of the one or more monomer unit(s) of formula I, each X can be the same or different and is independently selected from an anion. In some embodiments, the anion can be any suitable anion capable of being a counter ion to a cationic monomer unit. In some embodiments, each X can be the same or different and is independently selected from anion which comprises an element selected from a halogen, sulfur, carbon, silicon, boron, nitrogen, phosphorous, and combinations thereof. An exemplary list of anions comprises fluoride, chloride, bromide, iodide, sulfide, sulfite, sulfate, bisulfate, bisulfate, thiosulfate, carbonate, bicarbonate, silicate, tetrahydroxyborate, tetrafluoroborate, nitrate, nitrite, phosphate, hydrogen phosphate, dihydrogen phosphate, phosphite, hydrogen phosphite, dihydrogen phosphite, and hexafluorophosphate. In certain embodiments, each X can be the same or different and is independently selected from fluoride, chloride, bromide, or iodide, or a combination thereof.

In certain embodiments of the one or more monomer unit(s) of formula I, $R_1$ is hydrogen or $C_1$-$C_9$ alkyl. As used herein, "$C_1$-$C_9$ alkyl" refers to an alkyl carbon chain from 1 to 9 (i.e., 1, 2, 3, 4, 5, 6, 7, 8, or 9) carbons in length. In some embodiments, $C_1$-$C_9$ alkyl is saturated, unsaturated, branched, straight-chained, cyclic, or a combination thereof. An exemplary list of $C_1$-$C_9$ alkyl substituents is methyl, ethyl, n-propyl, iso-propyl, n-butyl, sec-butyl, tert-butyl, n-pentyl, sec-pentyl, neo-pentyl, hexyl, heptyl, octyl, nonyl, cyclopentyl, cyclohexyl, propenyl, 2-butenyl, 3-butenyl, 2-pentenyl, 3-pentenyl, 4-pentenyl, or a combination thereof. In certain embodiments, $R_1$ is hydrogen, methyl, or a combination thereof.

In certain embodiments of the one or more monomer unit(s) of formula I, $R_2$ is an aliphatic chain or a heteroaliphatic chain from about 10 to about 30 carbon units in length. In some embodiments, $R_2$ can be an aliphatic chain from about 10 to about 30 (e.g., 10, 11, 12, 13, 14, 15, 16, 17, 18, 19, 20, 21, 22, 23, 24, 25, 26, 27, 28, 29, or 30) carbon units in length. In some embodiments, the aliphatic chain from about 10 to about 30 carbon units in length is saturated, unsaturated, branched, straight-chained, cyclic, or a combination thereof. In certain embodiments, the aliphatic chain is further substituted with one or more aliphatic substituent(s), aryl substituents, heteroatoms, or combinations thereof. In some embodiments, $R_2$ can be a heteroaliphatic chain from about 10 to about 30 (e.g., 10, 11, 12, 13, 14, 15, 16, 17, 18, 19, 20, 21, 22, 23, 24, 25, 26, 27, 28, 29, or 30) carbon units in length. As used herein, "heteroaliphatic" refers to a saturated or unsaturated, substituted or unsubstituted, straight-chained, branched, or cyclic aliphatic chain that contains at least 1 heteroatom (e.g., O, S, N, and/or P) in the core of the molecule (i.e., the carbon backbone). In certain embodiments, the heteroaliphatic chain can be an ethylene oxide ("EO") or propylene oxide ("PO") chain. In certain embodiments, $R_2$ is an aliphatic chain or heteroaliphatic chain from about 10 to about 20 (e.g., 10, 11, 12, 13, 14, 15, 16, 17, 18, 19, or 20) carbon units in length. In certain embodiments, $R_2$ is an aliphatic chain or heteroaliphatic chain from about 10 carbon units in length.

As used herein, the term "substituted" means that one or more hydrogen(s) on the designated atom or group are replaced with another group provided that the designated atom's normal valence is not exceeded. For example, when the substituent is oxo (i.e., =O), then two hydrogens on the carbon atom are replaced. Combinations of substituents and/or variables are permissible provided that the substitutions do not significantly adversely affect synthesis or use of the compound.

In certain embodiments of the one or more monomer unit(s) of formula I, each $R_3$ can be the same or different and is independently selected from hydrogen, aryl, $C_1$-$C_9$ alkyl, or a combination thereof. In some embodiments, $R_3$ can be $C_1$-$C_9$ alkyl. As used herein, "$C_1$-$C_9$ alkyl" refers to an alkyl carbon chain from 1 to 9 (i.e., 1, 2, 3, 4, 5, 6, 7, 8, or 9) carbons in length. In some embodiments, $C_1$-$C_9$ alkyl can be saturated, unsaturated, branched, straight-chained, cyclic, or a combination thereof. An exemplary list of $C_1$-$C_9$ alkyl substituents is methyl, ethyl, n-propyl, iso-propyl, n-butyl, sec-butyl, tert-butyl, n-pentyl, sec-pentyl, neo-pentyl, hexyl, heptyl, octyl, nonyl, cyclopentyl, cyclohexyl, propenyl, 2-butenyl, 3-butenyl, 2-pentenyl, 3-pentenyl, 4-pentenyl, or a combination thereof.

In some embodiments, $R_3$ can be aryl. As used herein, "aryl" refers to any substituted or unsubstituted aryl or heteroaryl substituent. As used herein, "heteroaryl" refers to aromatic 5- or 6-membered monocyclic groups, 9- or 10-membered bicyclic groups, and 11- to 14-membered tricyclic groups which have at least one heteroatom (O, S, or N) in at least one of the rings. Each ring of the heteroaryl group containing a heteroatom can contain one or two oxygen or sulfur atoms and/or from one to four nitrogen atoms, provided that the total number of heteroatoms in each ring is four or less and each ring has at least one carbon atom. The fused rings completing the bicyclic and tricyclic groups may contain only carbon atoms and may be saturated, partially saturated, or unsaturated. The nitrogen and sulfur atoms optionally can be oxidized, and the nitrogen atoms optionally can be quaternized. Heteroaryl groups that are bicyclic or tricyclic must include at least one fully aromatic ring, but the other fused ring or rings can be aromatic or non-aromatic. In some embodiments, the aryl compound is phenyl, naphthyl, pyrrolyl, isoindolyl, indolizinyl, indolyl, furanyl, benzofuranyl, benzothiophenyl, thiophenyl, pyridyl, acridinyl, naphthyridinyl, quinolinyl, isoquinolinyl, isoxazolyl, oxazolyl, benzoxazolyl, isothiazolyl, thiazolyl, benzthiazolyl, imidazolyl, thiadiazolyl, tetrazolyl, triazolyl, oxadiazolyl, benzimidazolyl, purinyl, pyrazolyl, pyrazinyl, pteridinyl, quinoxalinyl, phthalazinyl, quinazolinyl, triazinyl, phenazinyl, cinnolinyl, pyrimidinyl, pyridazinyl, or a combination thereof. In certain embodiments, each $R_3$ is hydrogen, methyl, phenyl, or a combination thereof.

In certain embodiments of the one or more monomer unit(s) of formula I, the substituent "Z" is $CH_2$ and/or CHOH. In embodiments, where the substituent "Z" is $CH_2$ and/or CHOH the one or more monomer unit(s) of formula I are diquaternized ("diquat") monomer unit(s). As used herein, "diquaternized" refers to a monomer unit that has two quaternary amine centers.

In some embodiments, the one or more monomer unit(s) of formula I are derived from a monomer of formula Ia:

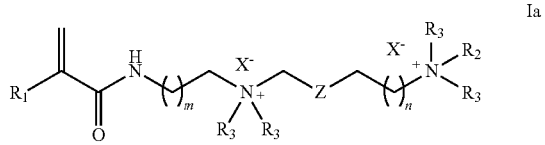

Ia wherein each X can be the same or different and is independently selected from an anion, $R_1$ is hydrogen or $C_1$-$C_9$ alkyl, $R_2$ is an aliphatic chain or a heteroaliphatic chain from about 10 to about 30 carbon units in length, each $R_3$ can be the same or different and is independently selected from hydrogen, aryl, $C_1$-$C_9$ alkyl, and a combination thereof, Z is $CH_2$, CHOH, CHOR, or a combination thereof, wherein R is a substituent with one or more quanternized amine(s), m is an integer from 0 to 11 (i.e., 0, 1, 2, 3, 4, 5, 6, 7, 8, 9, 10, or 11), and n is an integer from 0 to 5 (i.e., 0, 1, 2, 3, 4, or 5).

In certain embodiments, the one or more monomer unit(s) of formula I are formed post polymerization. For example, the one or more monomer unit(s) of formula I can be derived from a dialkylamino acrylamide monomer of formula Ib:

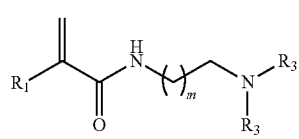

Ib wherein $R_1$ is hydrogen or $C_1$-$C_9$ alkyl, each $R_3$ can be the same or different and is independently selected from hydrogen, aryl, $C_1$-$C_9$ alkyl, and a combination thereof, and m is an integer from 0 to 11 (i.e., 0, 1, 2, 3, 4, 5, 6, 7, 8, 9, 10, or 11). In some instances, the one or more monomer unit(s) of formula I is derived from the dialkylamino acrylamide monomer of formula Ib, and is further functionalized post polymerization with, for example, a chloride of formula Ic:

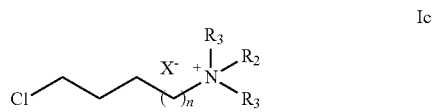

Ic wherein X is an anion, $R_2$ is an aliphatic chain or a heteroaliphatic chain from about 10 to about 30 carbon units in length, each $R_3$ can be the same or different and is independently selected from hydrogen, aryl, $C_1$-$C_9$ alkyl, and a combination thereof, and n is an integer from 0 to 5 (i.e., 0, 1, 2, 3, 4, or 5). In some instances, the one or more monomer unit(s) of formula I is derived from the dialkylamino acrylamide monomer of formula Ib, and is further functionalized post polymerization with, for example, an epoxide of formula Id:

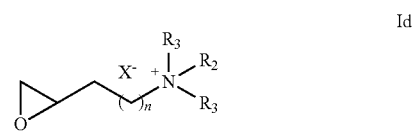

Id wherein X is an anion, $R_2$ is an aliphatic chain or a heteroaliphatic chain from about 10 to about 30 carbon units in length, each $R_3$ can be the same or different and is independently selected from hydrogen, aryl, $C_1$-$C_9$ alkyl, and a combination thereof, and n is an integer from 0 to 5 (i.e., 0, 1, 2, 3, 4, or 5).

As used herein, the substituent "R" refers to a substituent comprising one or more (e.g., one, two, three, four, five, six, or more) quaternary amine center(s). Without wishing to be bound to any particular theory, the substituent "R" is believed to be formed during the synthesis of the monomer of formula Ia and/or forming the one or more monomer unit(s) of formula I post polymerization. The oxygen present in substituent "Z" is capable of reacting with one or more compound(s) of formula Ic and/or Id. In certain embodiments, the substituent "R" is derived from one or more (e.g., one, two, three, four, five, six, or more) chloride(s) of formula Ic and/or epoxide(s) of formula Id.

The polymer can comprise any suitable amount of the one or more monomer unit(s) of formula I. In certain embodiments, the polymer comprises about 0.1 mol % of the one or more monomer unit(s) of formula I or more, for example, about 0.2 mol % or more, about 0.3 mol % or more, about 0.4 mol % or more, about 0.5 mol % or more, about 1 mol % or more, about 2 mol % or more, about 3 mol % or more, about 5 mol % or more, about 10 mol % or more, about 15 mol % or more, or about 20 mol % or more. Alternatively, or in addition, the polymer comprises about 80 mol % of the one or more monomer unit(s) of formula I or less, for example, about 75 mol % or less, about 70 mol % or less, about 65 mol % or less, about 60 mol % or less, about 55 mol % or less, about 50 mol % or less, about 45 mol % or less, about 40 mol % or less, about 35 mol % or less, about 30 mol % or less, or about 25 mol % or less. Any two of the foregoing endpoints can be used to define a close-ended range, or can be used singly to define an open-ended range. Thus, the polymer can comprise the one or more monomer unit(s) of formula I in an amount of from about 0.1 mol % to about 80 mol %, for example, about 0.1 mol % to about 75 mol %, about 0.1 mol % to about 70 mol %, about 0.1 mol % to about 65 mol %, about 0.1 mol % to about 60 mol %, about 0.1 mol % to about 55 mol %, about 0.1 mol % to about 50 mol %, about 0.1 mol % to about 45 mol %, about 0.1 mol % to about 40 mol %, about 0.1 mol % to about 35 mol %, about 0.1 mol % to about 30 mol %, about 0.1 mol % to about 25 mol %, about 0.1 mol % to about 25 mol %, about 0.2 mol % to about 25 mol %, about 0.3 mol % to about 25 mol %, about 0.5 mol % to about 25 mol %, about 1 mol % to about 25 mol %, about 2 mol % to about 25 mol %, about 3 mol % to about 25 mol %, about 5 mol % to about 25 mol %, about 10 mol % to about 25 mol %, about 15 mol % to about 25 mol %, about 20 mol % to about 25 mol %, about 10 mol % to about 40 mol %, about 10 mol % to about 60 mol %, about 10 mol % to about 80 mol %, about 20 mol % to about 40 mol %, about 20 mol % to about 60 mol %, or about 20 mol % to about 80 mol %.

The polymer comprises one or more monomer unit(s) of formula II:

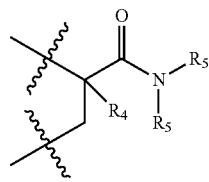

II wherein $R_4$ is hydrogen or $C_1$-$C_9$ alkyl, and each $R_5$ can be the same or different and is independently selected from hydrogen, aryl, $C_1$-$C_{10}$ aliphatic chain, $C_1$-$C_{10}$ heteroaliphatic chain, and a combination thereof.

In certain embodiments of the one or more monomer unit(s) of formula II, $R_4$ is hydrogen or $C_1$-$C_9$ alkyl. As used herein, "$C_1$-$C_9$ alkyl" refers to an alkyl carbon chain from 1 to 9 (i.e., 1, 2, 3, 4, 5, 6, 7, 8, or 9) carbons in length. In some embodiments, $C_1$-$C_9$ alkyl is saturated, unsaturated, branched, straight-chained, cyclic, or a combination thereof. An exemplary list of $C_1$-$C_9$ alkyl substituents is methyl, ethyl, n-propyl, iso-propyl, n-butyl, sec-butyl, tert-butyl, n-pentyl, sec-pentyl, neo-pentyl, hexyl, heptyl, octyl, nonyl, cyclopentyl, cyclohexyl, propenyl, 2-butenyl, 3-butenyl, 2-pentenyl, 3-pentenyl, 4-pentenyl, or a combination thereof. In certain embodiments, $R_4$ is hydrogen, methyl, or a combination thereof.

In certain embodiments of the one or more monomer unit(s) of formula II, each $R_5$ can be the same or different and is independently selected from hydrogen, aryl, $C_1$-$C_{10}$ aliphatic chain, $C_1$-$C_{10}$ heteroaliphatic chain, and a combination thereof. In some embodiments, $R_5$ can be a $C_1$-$C_{10}$ aliphatic chain. As used herein, "$C_1$-$C_{10}$ aliphatic chain" refers to an aliphatic carbon chain from 1 to 10 (i.e., 1, 2, 3, 4, 5, 6, 7, 8, 9, or 10) carbons in length. In some embodiments, the $C_1$-$C_{10}$ aliphatic chain is saturated, unsaturated, branched, straight-chained, cyclic, or a combination thereof. In certain embodiments, the aliphatic chain is further substituted with one or more aliphatic substituent(s), aryl substituents, heteroatoms, or combinations thereof. In some embodiments, $R_5$ can be a $C_1$-$C_{10}$ heteroaliphatic chain. As used herein, "$C_1$-$C_{10}$ heteroaliphatic chain" refers to a heteroaliphatic carbon chain from 1 to 10 (i.e., 1, 2, 3, 4, 5, 6, 7, 8, 9, or 10) carbons in length. As used herein, "heteroaliphatic" refers to a saturated or unsaturated, substituted or unsubstituted, straight-chained, branched, or cyclic aliphatic chain that contains at least 1 heteroatom (e.g., O, S, N, and/or P) in the core of the molecule (i.e., the carbon backbone). In certain embodiments, the heteroaliphatic chain can be an ethylene oxide ("EO") or propylene oxide ("PO") chain. In some embodiments, $R_5$ can be aryl. As used herein, "aryl" refers to any substituted or unsubstituted aryl or heteroaryl substituent. As used herein, "heteroaryl" refers to aromatic 5- or 6-membered monocyclic groups, 9- or 10-membered bicyclic groups, and 11- to 14-membered tricyclic groups which have at least one heteroatom (e.g., O, S, or N) in at least one of the rings. Each ring of the heteroaryl group containing a heteroatom can contain one or two oxygen or sulfur atoms and/or from one to four nitrogen atoms, provided that the total number of heteroatoms in each ring is four or less and each ring has at least one carbon atom. The fused rings completing the bicyclic and tricyclic groups may contain only carbon atoms and may be saturated, partially saturated, or unsaturated. The nitrogen and sulfur atoms optionally can be oxidized, and the nitrogen atoms optionally can be quaternized. Heteroaryl groups that are bicyclic or tricyclic must include at least one fully aromatic ring, but the other fused ring or rings can be aromatic or non-aromatic. In some embodiments, the aryl compound is phenyl, naphthyl, pyrrolyl, isoindolyl, indolizinyl, indolyl, furanyl, benzofuranyl, benzothiophenyl, thiophenyl, pyridyl, acridinyl, naphthyridinyl, quinolinyl, isoquinolinyl, isoxazolyl, oxazolyl, benzoxazolyl, isothiazolyl, thiazolyl, benzthiazolyl, imidazolyl, thiadiazolyl, tetrazolyl, triazolyl, oxadiazolyl, benzimidazolyl, purinyl, pyrazolyl, pyrazinyl, pteridinyl, quinoxalinyl, phthalazinyl, quinazolinyl, triazinyl, phenazinyl, cinnolinyl, pyrimidinyl, pyridazinyl, or a combination thereof. In certain embodiments, each $R_5$ is hydrogen, methyl, phenyl, or a combination thereof.

In certain embodiments, the one or more monomer unit(s) of formula II are derived from a monomer of formula IIa:

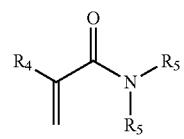

IIa wherein $R_4$ is hydrogen or $C_1$-$C_9$ alkyl, and each $R_5$ can be the same or different and is independently selected from hydrogen, aryl, $C_1$-$C_{10}$ aliphatic chain, $C_1$-$C_{10}$ heteroaliphatic chain, and a combination thereof.

The polymer can comprise any suitable amount of the one or more monomer unit(s) of formula II. In certain embodiments, the polymer comprises about 0.1 mol % of the monomer unit of formula II or more, for example, about 0.2 mol % or more, about 0.3 mol % or more, about 0.4 mol % or more, about 0.5 mol % or more, about 1 mol % or more, about 2 mol % or more, about 3 mol % or more, about 5 mol % or more, about 10 mol % or more, about 15 mol % or more, about 20 mol % or more, about 25 mol % or more, about 30 mol % or more, about 35 mol % or more, about 40 mol % or more, about 45 mol % or more, or about 50 mol % or more. Alternatively, or in addition, the polymer comprises about 99.9 mol % of the one or more monomer unit(s) of formula II or less, for example, about 99.8 mol % or less, about 99.7 mol % or less, about 99.6 mol % or less, about 99.5 mol % or less, about 99 mol % or less, about 98 mol % or less, about 97 mol % or less, about 96 mol % or less, about 95 mol % or less, about 90 mol % or less, about 85 mol % or less, about 80 mol % or less, about 75 mol % or less, about 70 mol % or less, about 65 mol % or less, about 60 mol % or less, or about 55 mol % or less. Any two of the foregoing endpoints can be used to define a close-ended range, or can be used singly to define an open-ended range. Thus, the polymer can comprise the one or more monomer unit(s) of formula II in an amount of from about 0.1 mol % to about 99.9 mol %, for example, about 0.1 mol % to about 99.8 mol %, about 0.1 mol % to about 99.7 mol %, about 0.1 mol % to about 99.6 mol %, about 0.1 mol % to about 99.5 mol %, about 0.1 mol % to about 99 mol %, about 0.1 mol % to about 98 mol %, about 0.1 mol % to about 97 mol %, about 0.1 mol % to about 96 mol %, about 0.1 mol % to about 95 mol %, about 0.1 mol % to about 90 mol %, about 0.1 mol % to about 85 mol %, about 0.1 mol % to about 80 mol %, about 0.1 mol % to about 75 mol %, about 0.1 mol % to about 70 mol %, about 0.1 mol % to about 65 mol %, about 0.1 mol % to about 60 mol %, about 0.1 mol % to about 55 mol %, about 0.2 mol % to about 55 mol %, about 0.3 mol % to about 55 mol %, about 0.5 mol % to about 55 mol %, about 1 mol % to about 55 mol %, about 2 mol % to about 55 mol %, about 3 mol % to about 55 mol %, about 5 mol % to about 55 mol %, about 10 mol % to about 55 mol %, about 15 mol % to about 55 mol %, about 20 mol % to about 55 mol %, about 25 mol % to about 55 mol %, about 30 mol % to about 55 mol %, about 35 mol % to about 55 mol %, about 40 mol % to about 55 mol %, about 45 mol % to about 55 mol %, about 50 mol % to about 55 mol %, about 10 mol % to about 40 mol %, about 10 mol % to about 60 mol %, about 10 mol % to about 80 mol %, about 20 mol % to about 40 mol %, about 20 mol % to about 60 mol %, about 20 mol % to about 80 mol %, about 50 mol % to about 99.9 mol %, about 50 mol % to about 90 mol %, or about 50 mol % to about 70 mol %.

In some embodiments, the polymer comprises one or more monomer unit(s) of formula III:

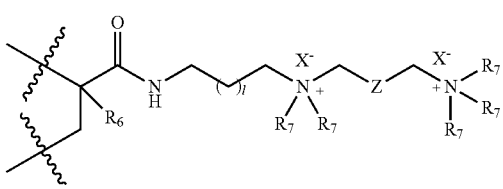

wherein each X can be the same or different and is independently selected from an anion, $R_6$ is hydrogen or $C_1$-$C_9$ alkyl, l is integer from 0 to 10 (i.e., 0, 1, 2, 3, 4, 5, 6, 7, 8, 9, or 10), Z is $CH_2$, CHOH, CHOR, or a combination thereof, wherein R is a substituent with one or more quanternized amine(s), and each $R_7$ can be the same or different and is independently selected from hydrogen, aryl, $C_1$-$C_9$ alkyl, and a combination thereof.

In certain embodiments of the one or more monomer unit(s) of formula III, each X can be the same or different and is independently selected from an anion. In some embodiments, the anion can be any suitable anion capable of being a counter ion to a cationic monomer unit. In some embodiments, each X can be the same or different and is independently selected from anion which comprises an element selected from a halogen, sulfur, carbon, silicon, boron, nitrogen, phosphorous, and combinations thereof. An exemplary list of anions comprises fluoride, chloride, bromide, iodide, sulfide, sulfite, sulfate, bisulfate, bisulfate, thiosulfate, carbonate, bicarbonate, silicate, tetrahydroxyborate, tetrafluoroborate, nitrate, nitrite, phosphate, hydrogen phosphate, dihydrogen phosphate, phosphite, hydrogen phosphite, dihydrogen phosphite, and hexafluorophosphate. In certain embodiments, each X can be the same or different and is independently selected from fluoride, chloride, or bromide, or a combination thereof.

In certain embodiments of the one or more monomer unit(s) of formula III, $R_6$ is hydrogen or $C_1$-$C_9$ alkyl. In some embodiments, $R_6$ can be $C_1$-$C_9$ alkyl. As used herein, "$C_1$-$C_9$ alkyl" refers to an alkyl carbon chain from 1 to 9 (i.e., 1, 2, 3, 4, 5, 6, 7, 8, or 9) carbons in length. In some embodiments, $C_1$-$C_9$ alkyl is saturated, unsaturated, branched, straight-chained, cyclic, or a combination thereof. An exemplary list of $C_1$-$C_9$ alkyl substituents is methyl, ethyl, n-propyl, iso-propyl, n-butyl, sec-butyl, tert-butyl, n-pentyl, sec-pentyl, neo-pentyl, hexyl, heptyl, octyl, nonyl, cyclopentyl, cyclohexyl, propenyl, 2-butenyl, 3-butenyl, 2-pentenyl, 3-pentenyl, 4-pentenyl, or a combination thereof. In certain embodiments, $R_6$ is hydrogen, methyl, or a combination thereof.

In certain embodiments of the one or more monomer unit(s) of formula III, each $R_7$ can be the same or different and is independently selected from hydrogen, aryl, $C_1$-$C_9$ alkyl, and a combination thereof. In some embodiments, $R_7$ can be $C_1$-$C_9$ alkyl. As used herein, "$C_1$-$C_9$ alkyl" refers to an alkyl carbon chain from 1 to 9 (i.e., 1, 2, 3, 4, 5, 6, 7, 8, or 9) carbons in length. In some embodiments, $C_1$-$C_9$ alkyl is saturated, unsaturated, branched, straight-chained, cyclic, or a combination thereof. An exemplary list of $C_1$-$C_9$ alkyl substituents is methyl, ethyl, n-propyl, iso-propyl, n-butyl, sec-butyl, tert-butyl, n-pentyl, sec-pentyl, neo-pentyl, hexyl, heptyl, octyl, nonyl, cyclopentyl, cyclohexyl, propenyl, 2-butenyl, 3-butenyl, 2-pentenyl, 3-pentenyl, 4-pentenyl, or a combination thereof.

In some embodiments, $R_7$ can be aryl. As used herein, "aryl" refers to any substituted or unsubstituted aryl or heteroaryl substituent. As used herein, "heteroaryl" refers to aromatic 5- or 6-membered monocyclic groups, 9- or 10-membered bicyclic groups, and 11- to 14-membered tricyclic groups which have at least one heteroatom (e.g., O, S, or N) in at least one of the rings. Each ring of the heteroaryl group containing a heteroatom can contain one or two oxygen or sulfur atoms and/or from one to four nitrogen atoms, provided that the total number of heteroatoms in each ring is four or less and each ring has at least one carbon atom. The fused rings completing the bicyclic and tricyclic groups may contain only carbon atoms and may be saturated, partially saturated, or unsaturated. The nitrogen and sulfur atoms optionally can be oxidized, and the nitrogen atoms optionally can be quaternized. Heteroaryl groups that are bicyclic or tricyclic must include at least one fully aromatic ring, but the other fused ring or rings can be aromatic or non-aromatic. In some embodiments, the aryl compound is phenyl, naphthyl, pyrrolyl, isoindolyl, indolizinyl, indolyl, furanyl, benzofuranyl, benzothiophenyl, thiophenyl, pyridyl, acridinyl, naphthyridinyl, quinolinyl, isoquinolinyl, isoxazolyl, oxazolyl, benzoxazolyl, isothiazolyl, thiazolyl, benzthiazolyl, imidazolyl, thiadiazolyl, tetrazolyl, triazolyl, oxadiazolyl, benzimidazolyl, purinyl, pyrazolyl, pyrazinyl, pteridinyl, quinoxalinyl, phthalazinyl, quinazolinyl, triazinyl, phenazinyl, cinnolinyl, pyrimidinyl, pyridazinyl, or a combination thereof. In certain embodiments, each $R_7$ is hydrogen, methyl, phenyl, or a combination thereof.

In certain embodiments of the one or more monomer unit(s) of formula III, the substituent "Z" is $CH_2$ and/or CHOH. In embodiments, where the substituent "Z" is $CH_2$ and/or CHOH the one or more monomer unit(s) of formula III are diquaternized ("diquat") monomer unit(s). As used herein, "diquaternized" refers to a monomer unit that has two quaternary amine centers.

In certain embodiments, the one or more monomer unit(s) of formula III is considered an "additional monomer unit."

In some embodiments, the one or more monomer unit(s) of formula III are derived from a monomer of formula IIIa:

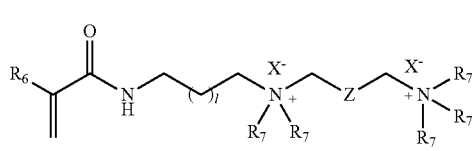

IIIa wherein each X can be the same or different and is independently selected from an anion, $R_6$ is hydrogen or $C_1$-$C_9$ alkyl, l is integer from 0 to 10 (i.e., 0, 1, 2, 3, 4, 5, 6, 7, 8, 9, or 10), Z is $CH_2$, CHOH, CHOR, or a combination thereof, wherein R is a substituent with one or more quanternized amine(s), and each $R_7$ can be the same or different and is independently selected from hydrogen, aryl, $C_1$-$C_9$ alkyl, or a combination thereof.

In certain embodiments, the one or more monomer unit(s) of formula III are formed post polymerization. For example, the one or more monomer unit(s) of formula III can be derived from a dialkylamino acrylamide monomer of formula IIIb:

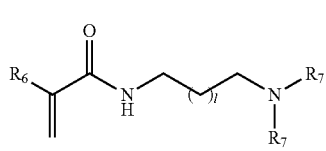

IIIb wherein $R_6$ is hydrogen or $C_1$-$C_9$ alkyl, l is integer from 0 to 10 (i.e., 0, 1, 2, 3, 4, 5, 6, 7, 8, 9, or 10), and each $R_7$ can be the same or different and is independently selected from hydrogen, aryl, $C_1$-$C_9$ alkyl, and a combination thereof. In some instances, the one or more monomer unit(s) of formula III is derived from the dialkylamino acrylamide monomer of formula IIIb, and is further functionalized post polymerization with, for example, a chloride of formula IIIc:

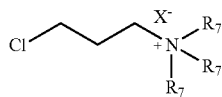

IIIc wherein X is an anion, and each $R_7$ can be the same or different and is independently selected from hydrogen, aryl, $C_1$-$C_9$ alkyl, and a combination thereof. In some instances, the one or more monomer unit(s) of formula III is derived from the dialkylamino acrylamide monomer of formula IIIb, and is further functionalized post polymerization with, for example, an epoxide of formula IIId:

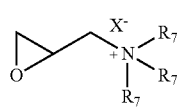

IIId wherein X is an anion, and each $R_7$ can be the same or different and is independently selected from hydrogen, aryl, $C_1$-$C_9$ alkyl, and a combination thereof.

In certain embodiments, when the one or more monomer unit(s) of formula III is present, the polymer can comprise any suitable amount of the one or more monomer unit(s) of formula III. In some embodiments, the polymer comprises about 0.1 mol % of the one or more monomer unit(s) of formula III or more, for example, about 0.2 mol % or more, about 0.3 mol % or more, about 0.4 mol % or more, about 0.5 mol % or more, about 1 mol % or more, about 2 mol % or more, about 3 mol % or more, about 5 mol % or more, about 10 mol % or more, about 15 mol % or more, or about 20 mol % or more. Alternatively, or in addition, the polymer comprises about 80 mol % of the one or more monomer unit(s) of formula III or less, for example, about 75 mol % or less, about 70 mol % or less, about 65 mol % or less, about 60 mol % or less, about 55 mol % or less, about 50 mol % or less, about 45 mol % or less, about 40 mol % or less, about 35 mol % or less, about 30 mol % or less, or about 25 mol % or less. Any two of the foregoing endpoints can be used to define a close-ended range, or can be used singly to define an open-ended range. Thus, the polymer can comprise the one or more monomer unit(s) of formula III in an amount of from about 0.1 mol % to about 80 mol %, for example, about 0.1 mol % to about 75 mol %, about 0.1 mol % to about 70 mol %, about 0.1 mol % to about 65 mol %, about 0.1 mol % to about 60 mol %, about 0.1 mol % to about 55 mol %, about 0.1 mol % to about 50 mol %, about 0.1 mol % to about 45 mol %, about 0.1 mol % to about 40 mol %, about 0.1 mol % to about 35 mol %, about 0.1 mol % to about 30 mol %, about 0.1 mol % to about 25 mol %, about 0.1 mol % to about 25 mol %, about 0.2 mol % to about 25 mol %, about 0.3 mol % to about 25 mol %, about 0.5 mol % to about 25 mol %, about 1 mol % to about 25 mol %, about 2 mol % to about 25 mol %, about 3 mol % to about 25 mol %, about 5 mol % to about 25 mol %, about 10 mol % to about 25 mol %, about 15 mol % to about 25 mol %, about 20 mol % to about 25 mol %, about 10 mol % to about 40 mol %, about 10 mol % to about 60 mol %, about 10 mol % to about 80 mol %, about 20 mol % to about 40 mol %, about 20 mol % to about 60 mol %, or about 20 mol % to about 80 mol %.

In some embodiments, the polymer comprises one or more additional monomer unit(s) selected from 2-(dimethylamino)ethyl acrylate ("DMAEA"), 2-(dimethylamino) ethyl methacrylate ("DMAEM"), 3-(dimethylamino)propyl methacrylamide ("DMAPMA"), 3-(dimethylamino)propyl acrylamide ("DMAPA"), 3-methacrylamidopropyl-trimethyl-ammonium chloride ("MAPTAC"), 3-acrylamidopropyl-trimethyl-ammonium chloride ("APTAC"), N-vinyl pyrrolidone ("NVP"), diallyldimethylammonium chloride ("DADMAC"), diallylamine ("DAA"), vinylformamide, 2-(acryloyloxy)-N,N,N-trimethylethanaminium chloride ("DMAEA.MCQ"), 2-(methacryloyloxy)-N,N,N-trimethylethanaminium chloride ("DMAEM.MCQ"), N,N-dimethylaminoethyl acrylate benzyl chloride ("DMAEA.BCQ"), N,N-dimethylaminoethyl methacrylate benzyl chloride ("DMAEM.BCQ"), 2-acrylamido-2-methylpropane sulfonic acid ("AMPS"), 2-acrylamido-2-methylbutane sulfonic acid ("AMBS"), [2-methyl-2-[(1-oxo-2-propenyl)amino]propyl]-phosphonic acid, (meth)acrylic acid, the monomer unit of formula III, salts thereof, and combinations thereof.

In certain embodiments, the one or more additional monomer unit(s) is a cationic monomer unit selected from diallyldimethylammonium chloride ("DADMAC"), 2-(acryloyloxy)-N,N,N-trimethylethanaminium chloride ("DMAEA.MCQ"), 2-(methacryloyloxy)-N,N,N-trimethylethanaminium chloride ("DMAEM.MCQ"), N,N-dimethylaminoethyl acrylate benzyl chloride ("DMAEA.BCQ"), N,N-dimethylaminoethyl methacrylate benzyl chloride ("DMAEM.BCQ"), 3-methacrylamidopropyl-trimethyl-ammonium chloride ("MAPTAC"), and 3-acrylamidopropyl-trimethyl-ammonium chloride ("APTAC"), the monomer unit of formula III, salts thereof, and combinations thereof.

In certain embodiments, the one or more additional monomer unit(s) is 2-(acryloyloxy)-N,N,N-trimethylethanaminium chloride ("DMAEA.MCQ"), diallyldimethylammonium chloride ("DADMAC"), the monomer unit of formula III, salts thereof, and combinations thereof.

As used herein, "(meth)acrylic acid" refers to any suitable (meth)acrylic acid monomer unit. For example, the (meth) acrylic acid monomer unit can be acrylic acid, methacrylic acid, or a combination thereof.

In certain embodiments, when the one or more additional monomer unit(s) is present, the polymer can comprise any suitable amount of the one or more additional monomer unit(s). In some embodiments, the polymer comprises about 0.1 mol % of the one or more additional monomer unit(s) or more, for example, about 0.2 mol % or more, about 0.3 mol % or more, about 0.4 mol % or more, about 0.5 mol % or more, about 1 mol % or more, about 2 mol % or more, about 3 mol % or more, about 5 mol % or more, about 10 mol % or more, about 15 mol % or more, about 20 mol % or more, about 25 mol % or more, about 30 mol % or more, about 35 mol % or more, about 40 mol % or more, about 45 mol % or more, or about 50 mol % or more. Alternatively, or in addition, the polymer comprises about 99.9 mol % of the one or more additional monomer unit(s) or less, for example, about 99.8 mol % or less, about 99.7 mol % or less, about 99.6 mol % or less, about 99.5 mol % or less, about 99 mol % or less, about 98 mol % or less, about 97 mol % or less, about 96 mol % or less, about 95 mol % or less, about 90 mol % or less, about 85 mol % or less, about 80 mol % or less, about 75 mol % or less, about 70 mol % or less, about 65 mol % or less, about 60 mol % or less, or about 55 mol % or less. Any two of the foregoing endpoints can be used to define a close-ended range, or can be used singly to define an open-ended range. Thus, the polymer can comprise the one or more additional monomer unit(s) in an amount of from about 0.1 mol % to about 99.9 mol %, for example, about 0.1 mol % to about 99.8 mol %, about 0.1 mol % to about 99.7 mol %, about 0.1 mol % to about 99.6 mol %, about 0.1 mol % to about 99.5 mol %, about 0.1 mol % to about 99 mol %, about 0.1 mol % to about 98 mol %, about 0.1 mol % to about 97 mol %, about 0.1 mol % to about 96 mol %, about 0.1 mol % to about 95 mol %, about 0.1 mol % to about 90 mol %, about 0.1 mol % to about 85 mol %, about 0.1 mol % to about 80 mol %, about 0.1 mol % to about 75 mol %, about 0.1 mol % to about 70 mol %, about 0.1 mol % to about 65 mol %, about 0.1 mol % to about 60 mol %, about 0.1 mol % to about 55 mol %, about 0.2 mol % to about 55 mol %, about 0.3 mol % to about 55 mol %, about 0.5 mol % to about 55 mol %, about 1 mol % to about 55 mol %, about 2 mol % to about 55 mol %, about 3 mol % to about 55 mol %, about 5 mol % to about 55 mol %, about 10 mol % to about 55 mol %, about 15 mol % to about 55 mol %, about 20 mol % to about 55 mol %, about 25 mol % to about 55 mol %, about 30 mol % to about 55 mol %, about 35 mol % to about 55 mol %, about 40 mol % to about 55 mol %, about 45 mol % to about 55 mol %, about 50 mol % to about 55 mol %, about 10 mol % to about 40 mol %, about 10 mol % to about 60 mol %, about 10 mol % to about 80 mol %, about 20 mol % to about 40 mol %, about 20 mol % to about 60 mol %, about 20 mol % to about 80 mol %, about 50 mol % to about 99.9 mol %, about 50 mol % to about 90 mol %, or about 50 mol % to about 70 mol %.

In some embodiments, the polymer is a cationic polymer. As used herein, "cationic polymer" refers to a polymer consisting of cationic monomer units, or cationic monomer units and non-ionic monomer units. In certain embodiments, the polymer is an alternating copolymer, a random copolymer, a block copolymer, or a graft copolymer. The cationic polymer can contain any suitable number of different monomer units. For example, the cationic polymer can contain at least 2 different monomer units, at least 3 different monomer units, at least 4 different monomer units, at least 5 different monomer units, or at least 6 different monomer units.

In some embodiments, the polymer is an amphoteric polymer. As used herein, "amphoteric polymer" refers to a polymer consisting of cationic monomer units and anionic monomer units, or cationic monomer units, anionic monomer units, and non-ionic monomer units. In certain embodiments, the polymer is an alternating copolymer, a random copolymer, a block copolymer, or a graft copolymer. The amphoteric polymer can contain any suitable number of different monomer units. For example, the amphoteric polymer can contain at least 2 different monomer units, at least 3 different monomer units, at least 4 different monomer units, at least 5 different monomer units, or at least 6 different monomer units.

In some embodiments, the polymer is characterized by the reduced specific viscosity ("RSV"). The RSV is measured at a given polymer concentration and temperature and calculated as follows:

$$RSV = \frac{\left(\frac{\eta}{\eta^0 - 1}\right)}{c}$$

wherein $\eta$ is viscosity of the polymer solution, $\eta_0$ is viscosity of the solvent at the same temperature, and c is concentration (g/dL) of the polymer in solution. The reduced specific viscosity can be measured at any suitable concentration and any suitable temperature. In some embodiments, the reduced specific viscosity is measured as a 450 ppm solution of the polymer at room temperature. In certain embodiments, the reduced specific viscosity is measured as a 450 ppm solution of the polymer at 30° C.

The polymer can have any suitable reduced specific velocity. For example, the polymer can have an RSV of about 0.1 dL/g or more, for example, about 0.2 dL/g or more, about 0.3 dL/g or more, about 0.4 dL/g or more, about 0.5 dL/g or more, about 1 dL/g or more, about 2 dL/g or more, about 3 dL/g or more, about 4 dL/g or more, or about 5 dL/g or more. Alternatively, or in addition, the polymer can have an RSV of about 15 dL/g or less, for example, about 14 dL/g or less, about 13 dL/g or less, about 12 dL/g or less, about 11 dL/g or less, about 10 dL/g or less, about 9 dL/g or less, about 8 dL/g or less, about 7 dL/g or less, or about 6 dL/g or less. Any two of the foregoing endpoints can be used to define a close-ended range, or can be used singly to define an open-ended range. Thus, the polymer can have an RSV in an amount of from about 0.1 dL/g to about 15 dL/g, for example, about 0.1 dL/g to about 14 dL/g, about 0.1 dL/g to about 13 dL/g, about 0.1 dL/g to about 12 dL/g, about 0.1 dL/g to about 11 dL/g, about 0.1 dL/g to about 10 dL/g, about 0.1 dL/g to about 9 dL/g, about 0.1 dL/g to about 8 dL/g, about 0.1 dL/g to about 7 dL/g, about 0.1 dL/g to about 6 dL/g, about 0.2 dL/g to about 6 dL/g, about 0.3 dL/g to about 6 dL/g, about 0.5 dL/g to about 6 dL/g, about 1 dL/g to about 6 dL/g, about 2 dL/g to about 6 dL/g, about 3 dL/g to about 6 dL/g, about 4 dL/g to about 6 dL/g, about 5 dL/g to about 6, about 1 dL/g to about 12 dL/g, about 2 dL/g to about 12 dL/g, about 1 dL/g to about 8 dL/g, or about 1 dL/g to about 6 dL/g.

The polymer can be synthesized by any suitable polymerization method. For example, the polymer can be made through emulsion polymerization, dispersion polymerization, free radical polymerization, solution polymerization, gel/dry polymerization, or a combination thereof.

A method to reduce pitch and stickies deposition, improve retention and drainage, and enhance dry strength properties of paper, such as tensile strength, STFI index, ring crush index, and burst index by treating paper slurry with the polymer during a papermaking process is also provided. In certain embodiments, the method comprises treating pulp slurry with a polymer comprising one or more monomer unit(s) of formula I:

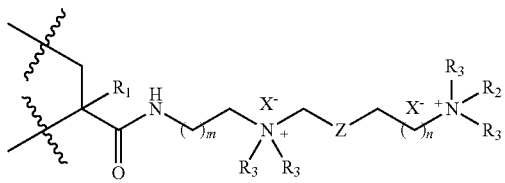

wherein each X can be the same or different and is independently selected from an anion, $R_1$ is hydrogen or $C_1$-$C_9$ alkyl, $R_2$ is an aliphatic chain or a heteroaliphatic chain from about 10 to about 30 carbon units in length, each $R_3$ can be the same or different and is independently selected from hydrogen, aryl, $C_1$-$C_9$ alkyl, and a combination thereof, Z is $CH_2$, CHOH, CHOR, or a combination thereof, wherein R is a substituent with one or more quanternized amine(s), m is an integer from 0 to 11, and n is an integer from 0 to 5; one or more monomer unit(s) of formula II:

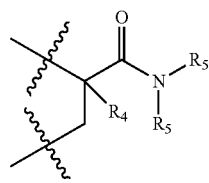

wherein $R_4$ is hydrogen or $C_1$-$C_9$ alkyl, and each $R_5$ can be the same or different and is independently selected from hydrogen, aryl, $C_1$-$C_{10}$ aliphatic chain, $C_1$-$C_{10}$ heteroaliphatic chain, and a combination thereof; and an additional monomer unit selected from 2-(dimethylamino)ethyl acrylate ("DMAEA"), 2-(dimethylamino)ethyl methacrylate ("DMAEM"), 3-(dimethylamino)propyl methacrylamide ("DMAPMA"), 3-(dimethylamino)propyl acrylamide ("DMAPA"), 3-methacrylamidopropyl-trimethyl-ammonium chloride ("MAPTAC"), 3-acrylamidopropyl-trimethyl-ammonium chloride ("APTAC"), N-vinyl pyrrolidone ("NVP"), diallyldimethylammonium chloride ("DADMAC"), diallylamine, vinylformamide, 2-(acryloyloxy)-N,N,N-trimethylethanaminium chloride ("DMAE-A.MCQ"), 2-(methacryloyloxy)-N,N,N-trimethylethanaminium chloride ("DMAEM.MCQ"), N,N-dimethylaminoethyl acrylate benzyl chloride ("DMAEA.BCQ"), N,N-dimethylaminoethyl methacrylate benzyl chloride ("DMAEM.BCQ"), 2-acrylamido-2-methylpropane sulfonic acid ("AMPS"), 2-acrylamido-2-methylbutane sulfonic acid ("AMBS"), [2-methyl-2-[(1-oxo-2-propenyl)amino]propyl]-phosphonic acid, (meth)acrylic acid, one or more monomer unit(s) of formula III:

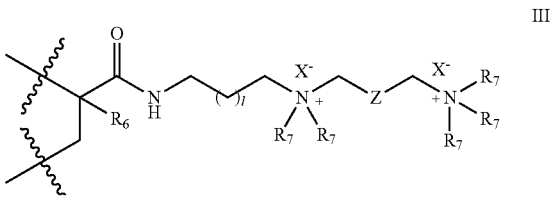

wherein each X can be the same or different and is independently selected from an anion, $R_6$ is hydrogen or $C_1$-$C_9$ alkyl, l is integer from 0 to 10 (i.e., 0, 1, 2, 3, 4, 5, 6, 7, 8, 9, or 10), Z is $CH_2$, CHOH, CHOR, or a combination thereof, wherein R is a substituent with one or more quanternized amine(s), and each $R_7$ can be the same or different and is independently selected from hydrogen, aryl, $C_1$-$C_9$ alkyl, and a combination thereof, salts thereof, and a combination thereof.

The individual components of the polymer used in the method of controlling pitch and stickies deposition in papermaking process, for example, one or more monomer unit(s) of formula I, one or more monomer unit(s) of formula II, one or more monomer unit(s) of formula III, and one or more additional monomer unit(s), are as defined by the parameters set forth herein.

The structure of the individual components of the polymer used in the method of controlling pitch and stickies deposition in papermaking process, for example, one or more monomer unit(s) of formula I, one or more monomer unit(s) of formula II, one or more monomer unit(s) of formula III, and one or more additional monomer unit(s), are as defined by the parameters set forth herein.

The quantities of the of the individual components of the polymer used the method of controlling pitch and stickies deposition in papermaking process, for example, one or more monomer unit(s) of formula I, one or more monomer unit(s) of formula II, one or more monomer unit(s) of formula III, and one or more additional monomer unit(s), are as defined by the parameters set forth herein.

The physical characteristics of the polymer used in the method of controlling pitch and stickies deposition in papermaking process are as defined by the parameters set forth herein.

In some embodiments, the method comprises treating pulp slurry with the polymer. In some embodiments, the polymer is added to a papermaking process involving virgin pulp, recycled pulp, or a combination thereof at any one or more of various location(s) during the papermaking process. In certain embodiments, the polymer can be added to the pulp slurry in a pulper, latency chest, reject refiner chest, disk filter or Decker feed or accept, whitewater system, pulp stock storage chests (either low density ("LD"), medium consistency ("MC"), or high consistency ("HC")), blend chest, machine chest, headbox, save-all chest, paper machine whitewater system, or combinations thereof. In certain embodiments, the polymer is added to pulp slurry upstream of a head box of a papermaking process. In certain embodiments, the polymer is added to pulp slurry upstream of a mixing chest of a papermaking process.

In some embodiments, the pulp slurry comprises recycled fibers. In certain embodiments, the recycled fibers can be obtained from a variety of paper products or fiber containing products, such as paperboard, newsprint, printing grades, sanitary or other paper products. In some instances, these products can comprise, for example, old corrugated cardboard ("OCC"), old newsprint ("ONP"), mixed office waste ("MOW"), magazines, books, or a combination thereof. Generally, these types of paper products contain hydrophobic contaminants. In some embodiments, the pulp slurry comprises virgin fibers. In embodiments comprising virgin fibers, the pulp can be derived from softwood, hardwood, or blends thereof. In certain embodiments, the virgin pulp can include bleached or unbleached Kraft, sulfite pulp or other chemical pulps, and groundwood ("GW") or other mechanical pulps such as, for example, thermomechanical pulp ("TMP").

The pulp slurry can be treated with (i.e., added to) the polymer in any suitable amount. For example, the amount of polymer added to the pulp slurry may be about 1 ppm or more, for example, about 5 ppm or more, about 10 ppm or more, about 25 ppm or more, or about 50 ppm or more. Alternatively, or in addition, the amount of polymer added to the pulp slurry may be about 500 ppm or less, for example, about 400 ppm or less, about 300 ppm or less, about 200 ppm or less, or about 100 ppm or less. Any two of the foregoing endpoints can be used to define a close-ended range, or can be used singly to define an open-ended range. Thus, the amount of polymer added to the pulp slurry can be of from about 1 ppm to about 500 ppm, for example, about 1 ppm to about 400 ppm, about 1 ppm to about 300 ppm, about 1 ppm to about 200 ppm, about 1 ppm to about 100 ppm, about 5 ppm to about 100 ppm, about 10 ppm to about 100 ppm, about 25 ppm to about 100 ppm, about 50 ppm to about 100 ppm, about 5 ppm to about 500 ppm, about 5 ppm to about 100 ppm, about 10 ppm to about 500 ppm, about 10 ppm to about 100 ppm, about 25 ppm to about 500 ppm, or about 25 ppm to about 100 ppm.

In some embodiments, the method can control the amount of pitch and stickies present in paper mill furnish. In some embodiments, the method can reduce, inhibit or eliminate the deposition of pitch and stickies contaminants in a papermaking process. In some embodiments, the method can also reduce the size of pitch and stickies contaminant particles through dispersion and suppressing agglomeration, and/or reduce the tackiness of the pitch and stickies contaminants when compared to a papermaking process in which the polymer is not employed. Without wishing to be bound by any particular theory, the localized high cationic charge density and the hydrophobicity of the multiquat monomers present in the polymer are believed to synergistically interact with pitch or stickies, and consequently disperse pitch or fix stickies to fibers based on the polymer solubility.

In some embodiments, the method can reduce the average size of pitch and stickies contaminant particles by at least about 1% or more, for example, about 2% or more, about 3% or more, about 4% or more, about 5% or more, about 6% or more, about 7% or more, about 8% or more, about 9% or more, or about 10% or more. Alternatively, or in addition, the method can reduce the average size of pitch and stickies contaminant particles by at least about 50% or less, for example, about 45% or less, about 40% or less, about 35% or less, about 30% or less, about 25% or less, about 20% or less, or about 15% or less. Any two of the foregoing endpoints can be used to define a close-ended range, or can be used singly to define an open-ended range. Thus, the method can reduce the average size of pitch and stickies contaminant particles of from about 1% to about 50%, for example, about 1% to about 45%, about 1% to about 40%, about 1% to about 35%, about 1% to about 30%, about 1% to about 25%, about 1% to about 20%, about 1% to about 15%, about 2% to about 15%, about 3% to about 15%, about 4% to about 15%, about 5% to about 15%, about 6% to about 15%, about 7% to about 15%, about 8% to about 15%, about 9% to about 15%, about 10% to about 15%, about 5% to about 10%, about 5% to about 20%, or about 10% to about 20%.

In some embodiments, the method can reduce the deposition of pitch and stickies by at least about 1% or more, for example, about 2% or more, about 3% or more, about 4% or more, about 5% or more, about 6% or more, about 7% or more, about 8% or more, about 9% or more, about 10% or more, about 15% or more, about 20% or more, about 25%, or more, about 30% or more, about 35% or more, or about 40% or more. Alternatively, or in addition, the method can reduce the deposition of pitch and stickies by at least about 95% or less, for example, about 85% or less, about 80% or less, about 75% or less, about 70% or less, about 65% or less, about 60% or less, about 55% or less, about 50% or less, or about 45% or less). Any two of the foregoing endpoints can be used to define a close-ended range, or can be used singly to define an open-ended range. Thus, the method can reduce the deposition of pitch and stickies of from about 1% to about 95%, for example, about 1% to about 90%, about 1% to about 85%, about 1% to about 80%, about 1% to about 75%, about 1% to about 70%, about 1% to about 65%, about 1% to about 60%, about 1% to about 55%, about 1% to about 50%, about 1% to about 45%, about 2% to about 45%, about 3% to about 45%, about 4% to about 45%, about 5% to about 45%, about 6% to about 45%, about 7% to about 45%, about 8% to about 45%, about 9% to about 45%, about 10% to about 45%, about 15% to about 45%, about 20% to about 45%, about 25% to about 45%, about 30% to about 45%, about 35% to about 45%, about 40% to about 45%, about 10% to about 50%, about 40% to about 95%, about 20% to about 80%, about 10% to about 95%, or about 30% to about 95%. As used herein, the term "stickies" can include synthetic polymers resulting from adhesives and the like, glues, hot melts, coatings, coating binders, pressure sensitive binders, unpulped wet strength resins, or combinations thereof.

As used herein, the term "pitch" can include wood resins, rosin and resin acid salts. Generally, these types of materials are found in paper containing products, such as newsprint, corrugated cardboard, and/or mixed office waste.

Generally, pitch and stickies have polymers present, such as styrene and/or butadiene rubber, vinyl acrylate polymers, polyisoprene, polybutadiene, natural rubber, ethyl vinyl acetate polymers, polyvinyl acetates, ethylvinyl alcohol polymers, polyvinyl alcohols, styrene acrylate polymers, and/or other synthetic type polymers.

In some embodiments, the method of treating pulp slurry with the polymer enhances the dry strength of paper in a papermaking process relative to a method wherein the pulp slurry has not been treated with the polymer. For example, the method of treating pulp slurry with the polymer can enhance the tensile strength of paper, ring crush index, STFI index, burst index, or a combination thereof. As used herein, the term "ring crush" refers to a test which measures the strength of liner or fluting both in the machine direction and perpendicular to it, according to ISO 12192 and TAPPI 822 protocols. As used herein, the term "STFI" means short span compression test, or a method of measuring paper's resistance to compressive forces, and is defined in TAPPI Method T826 as well as the article "*The comparative response of Ring Crush Test and STFI Short Span Crush Test to paper mill process variable changes*," by Joseph J. Batelka, Corrugating International (Oct. 2000).

In some embodiments, the method of treating pulp slurry with the polymer improves retention and drainage in a papermaking process. Generally, an improvement in the efficiency of drainage processes decreases the amount of water required to be removed by other methods (e.g., heat) and hence improve the overall efficiency of dewatering.

The invention is further illustrated by the following embodiments.

(1) A polymer for use in papermaking comprising, one or more monomer unit(s) of formula I:

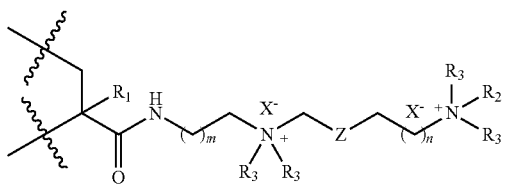

wherein each X can be the same or different and is independently selected from an anion, $R_1$ is hydrogen or $C_1$-$C_9$ alkyl, $R_2$ is an aliphatic chain or a heteroaliphatic chain from about 10 to about 30 carbon units in length, each $R_3$ can be the same or different and is independently selected from hydrogen, aryl, $C_1$-$C_9$ alkyl, and a combination thereof, Z is $CH_2$, CHOH, CHOR, or a combination thereof, wherein R is a substituent with one or more quanternized amine(s), m is an integer from 0 to 11, and n is an integer from 0 to 5; one or more monomer unit(s) of formula II:

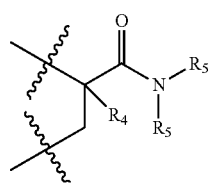

wherein $R_4$ is hydrogen or $C_1$-$C_9$ alkyl, and each $R_5$ can be the same or different and is independently selected from hydrogen, aryl, $C_1$-$C_{10}$ aliphatic chain, $C_1$-$C_{10}$ heteroaliphatic chain, and a combination thereof; and one or more monomer unit(s) of formula III:

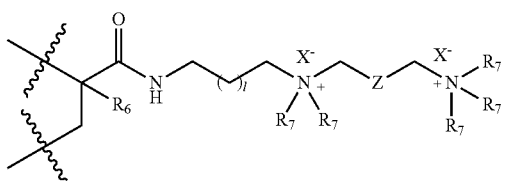

wherein each X can be the same or different and is independently selected from an anion, $R_6$ is hydrogen or $C_1$-$C_9$ alkyl, l is integer from 0 to 10 (i.e., 0, 1, 2, 3, 4, 5, 6, 7, 8, 9, or 10), Z is $CH_2$, CHOH, CHOR, or a combination thereof, wherein R is a substituent with one or more quanternized amine(s), and each $R_7$ can be the same or different and is independently selected from hydrogen, aryl, $C_1$-$C_9$ alkyl, and a combination thereof.

(2) The polymer of embodiment (1), comprising from about 0.1 mol % to about 80 mol % of the one or more monomer unit(s) of formula III.

(3) The polymer of embodiment (2), comprising from about 20 mol % to about 60 mol % of the one or more monomer unit(s) of formula III.

(4) The polymer of embodiment (3), comprising from about 20 mol % to about 40 mol % of the one or more monomer unit(s) of formula III.

(5) A polymer for use in papermaking comprising, one or more monomer unit(s) of formula I:

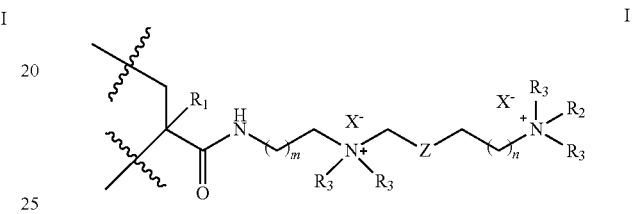

wherein each X can be the same or different and is independently selected from an anion, $R_1$ is hydrogen or $C_1$-$C_9$ alkyl, $R_2$ is an aliphatic chain or a heteroaliphatic chain from about 10 to about 30 carbon units in length, each $R_3$ can be the same or different and is independently selected from hydrogen, aryl, $C_1$-$C_9$ alkyl, and a combination thereof, Z is $CH_2$, CHOH, CHOR, or a combination thereof, wherein R is a substituent with one or more quanternized amine(s), m is an integer from 0 to 11, and n is an integer from 0 to 5; one or more monomer unit(s) of formula II:

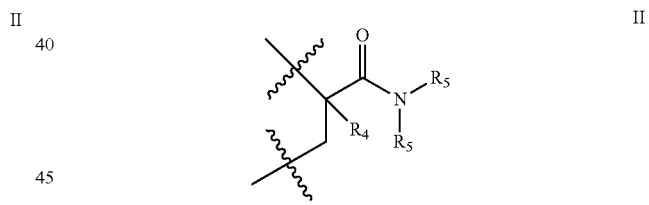

wherein $R_4$ is hydrogen or $C_1$-$C_9$ alkyl, and each $R_5$ can be the same or different and is independently selected from hydrogen, aryl, $C_1$-$C_{10}$ aliphatic chain, $C_1$-$C_{10}$ heteroaliphatic chain, and a combination thereof; and an additional monomer unit selected from 2-(dimethylamino)ethyl acrylate ("DMAEA"), 2-(dimethylamino)ethyl methacrylate ("DMAEM"), 3-(dimethylamino)propyl methacrylamide ("DMAPMA"), 3-(dimethylamino)propyl acrylamide ("DMAPA"), 3-methacrylamidopropyl-trimethyl-ammonium chloride ("MAPTAC"), 3-acrylamidopropyl-trimethyl-ammonium chloride ("APTAC"), N-vinyl pyrrolidone ("NVP"), diallyldimethylammonium chloride ("DADMAC"), diallylamine, vinylformamide, 2-(acryloyloxy)-N,N,N-trimethylethanaminium chloride ("DMAE-A.MCQ"), 2-(methacryloyloxy)-N,N,N-trimethylethanaminium chloride ("DMAEM.MCQ"), N,N-dimethylaminoethyl acrylate benzyl chloride ("DMAEA.BCQ"), N,N-dimethylaminoethyl methacrylate benzyl chloride ("DMAEM.BCQ"), 2-acrylamido-2-methylpropane sulfonic acid ("AMPS"), 2-acrylamido-2-methylbutane sulfonic acid ("AMBS"), [2-methyl-2-[(1-oxo-2-propenyl)amino]propyl]-phosphonic acid, (meth)acrylic acid, salts thereof, and combinations thereof.

(6) The polymer of embodiment (5), wherein the one or more additional monomer unit(s) is a cationic monomer unit selected from diallyldimethylammonium chloride ("DADMAC"), 2-(acryloyloxy)-N,N,N-trimethylethanaminium chloride ("DMAEA.MCQ"), 2-(methacryloyloxy)-N,N,N-trimethylethanaminium chloride ("DMAEM.MCQ"), N,N-dimethylaminoethyl acrylate benzyl chloride ("DMAEA.BCQ"), N,N-dimethylaminoethyl methacrylate benzyl chloride ("DMAEM.BCQ"), 3-methacrylamidopropyl-trimethyl-ammonium chloride ("MAPTAC"), and 3-acrylamidopropyl-trimethyl-ammonium chloride ("APTAC").

(7) The polymer of embodiment (6), wherein the one or more additional monomer unit(s) is diallyldimethylammonium chloride ("DADMAC").

(8) The polymer of embodiment (6) or (7), comprising from about 50 mol % to about 90 mol % of the one or more additional monomer unit(s).

(9) The polymer of embodiment (8), comprising from about 70 mol % to about 90 mol % of the one or more additional monomer unit(s).

(10) The polymer of any one of embodiments (1)-(9), comprising from about 0.1 mol % to about 10 mol % of the one or more monomer unit(s) of formula I.

(11) The polymer of embodiment (10), comprising from about 0.1 mol % to about 5 mol % of the one or more monomer unit(s) of formula I.

(12) The polymer of embodiment (11), comprising about 2 mol % of the one or more monomer unit(s) of formula I.

(13) The polymer of any one of embodiments (1)-(12), wherein $R_2$ is an aliphatic chain selected from about 10 to about 20 carbon units in length or a combination thereof.

(14) The polymer of embodiment (13), wherein $R_2$ is an aliphatic chain of about 12 carbon units in length.

(15) The polymer of any one of embodiments (1)-(14), wherein each X can be the same or different and is independently an anion which comprises an element selected from the group consisting of a halogen, sulfur, carbon, silicon, boron, nitrogen, phosphorous, and combinations thereof.

(16) The polymer of embodiment (15), wherein each X can be the same or different and is independently a halogen selected from the group consisting of fluoride, chloride, bromide, iodide, and combinations thereof.

(17) Use of the polymer of any one of embodiments (1)-(16) in pulping or papermaking.

(18) A method of controlling (pitch and stickies) deposition in papermaking process, comprising treating pulp slurry with a polymer comprising, one or more monomer unit(s) of formula I:

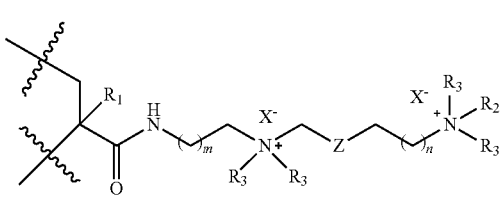

wherein each X can be the same or different and is independently selected from an anion, $R_1$ is hydrogen or $C_1$-$C_9$ alkyl, $R_2$ is an aliphatic chain or a heteroaliphatic chain from about 10 to about 30 carbon units in length, each $R_3$ can be the same or different and is independently selected from hydrogen, aryl, $C_1$-$C_9$ alkyl, and a combination thereof, Z is $CH_2$, CHOH, or CHOR, wherein R is a substituent with one or more quanternized amine(s), m is an integer from 0 to 11, and n is an integer from 0 to 5; one or more monomer unit(s) of formula II:

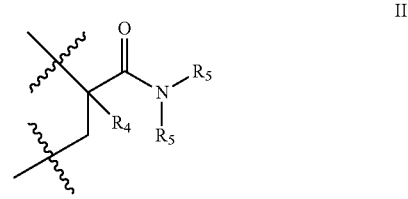

wherein $R_4$ is hydrogen or $C_1$-$C_9$ alkyl, and each $R_5$ can be the same or different and is independently selected from hydrogen, aryl, $C_1$-$C_{10}$ aliphatic chain, $C_1$-$C_{10}$ heteroaliphatic chain, and a combination thereof; and one or more additional monomer unit(s) selected from 2-(dimethylamino)ethyl acrylate ("DMAEA"), 2-(dimethylamino)ethyl methacrylate ("DMAEM"), 3-(dimethylamino)propyl methacrylamide ("DMAPMA"), 3-(dimethylamino)propyl acrylamide ("DMAPA"), 3-methacrylamidopropyl-trimethyl-ammonium chloride ("MAPTAC"), 3-acrylamidopropyl-trimethyl-ammonium chloride ("APTAC"), N-vinyl pyrrolidone ("NVP"), diallyldimethylammonium chloride ("DADMAC"), diallylamine, vinylformamide, 2-(acryloyloxy)-N,N,N-trimethylethanaminium chloride ("DMAEA.MCQ"), 2-(methacryloyloxy)-N,N,N-trimethylethanaminium chloride ("DMAEM.MCQ"), N,N-dimethylaminoethyl acrylate benzyl chloride ("DMAEA.BCQ"), N,N-dimethylaminoethyl methacrylate benzyl chloride ("DMAEM.BCQ"), 2-acrylamido-2-methylpropane sulfonic acid ("AMPS"), 2-acrylamido-2-methylbutane sulfonic acid ("AMBS"), [2-methyl-2-[(1-oxo-2-propenyl)amino]propyl]-phosphonic acid, (meth)acrylic acid, one or more monomer unit(s) of formula III:

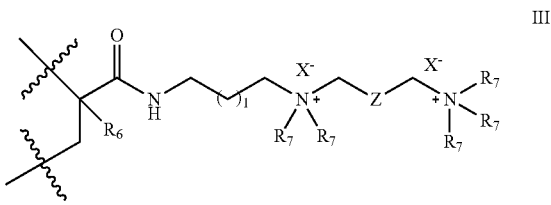

wherein each X can be the same or different and is independently selected from an anion, $R_6$ is hydrogen or $C_1$-$C_9$ alkyl, l is integer from 0 to 10 (i.e., 0, 1, 2, 3, 4, 5, 6, 7, 8, 9, or 10), Z is $CH_2$, CHOH, CHOR, or a combination thereof, wherein R is a substituent with one or more quanternized amine(s), and each $R_7$ can be the same or different and is independently selected from hydrogen, aryl, $C_1$-$C_9$ alkyl, and a combination thereof, salts thereof, and a combination thereof.

(19) The method of embodiment (18), wherein the one or more additional monomer unit(s) is a cationic monomer unit selected from diallyldimethylammonium chloride ("DADMAC"), 2-(acryloyloxy)-N,N,N-trimethylethanaminium chloride ("DMAEA.MCQ"), 2-(methacryloyloxy)-N,N,N-trimethylethanaminium chloride ("DMAEM.

MCQ"), N,N-dimethylaminoethyl acrylate benzyl chloride ("DMAEA.BCQ"), N,N-dimethylaminoethyl methacrylate benzyl chloride ("DMAEM.BCQ"), and 3-methacrylamidopropyl-trimethyl-ammonium chloride ("MAPTAC"), 3-acrylamidopropyl-trimethyl-ammonium chloride ("APTAC"), one or more monomer unit(s) of formula III:

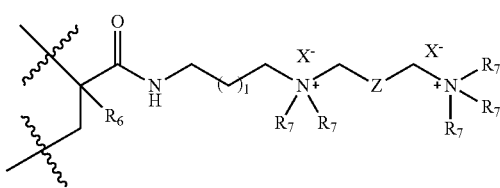

wherein each X can be the same or different and is independently selected from an anion, $R_6$ is hydrogen or $C_1$-$C_9$ alkyl, l is integer from 0 to 10 (i.e., 0, 1, 2, 3, 4, 5, 6, 7, 8, 9, or 10), Z is $CH_2$, CHOH, CHOR, or a combination thereof, wherein R is a substituent with one or more quanternized amine(s), and each $R_7$ can be the same or different and is independently selected from hydrogen, aryl, $C_1$-$C_9$ alkyl, and a combination thereof, salts thereof, and a combination thereof.

(20) The method of embodiment (19), wherein the one or more additional monomer unit(s) is one or more monomer unit(s) of formula III.

(21) The method of embodiment (20), wherein the polymer comprises from about 0.1 mol % to about 80 mol % of the one or more additional monomer unit(s) of formula III.

(22) The method of embodiment (21), wherein the polymer comprises from about 20 mol % to about 60 mol % of the one or more additional monomer unit(s) of formula III.

(23) The method of embodiment (22), wherein the polymer comprises from about 20 mol % to about 40 mol % of the one or more additional monomer unit(s) of formula III.

(24) The method of embodiment (19), wherein the one or more additional monomer unit(s) is diallyldimethylammonium chloride ("DADMAC").

(25) The method of embodiment (24), wherein the polymer comprises from about 50 mol % to about 90 mol % of diallyldimethylammonium chloride ("DADMAC").

(26) The method of embodiment (25), wherein the polymer comprises from about 70 mol % to about 90 mol % of diallyldimethylammonium chloride ("DADMAC").

(27) The method of any one of embodiments (18)-(26), wherein the polymer comprises from about 0.1 mol % to about 10 mol % of the one or more monomer unit(s) of formula I.

(28) The method of embodiment (27), wherein the polymer comprises from about 0.1 mol % to about 5 mol % of the one or more monomer unit(s) of formula I.

(29) The method of embodiment (28), wherein the polymer comprises about 2 mol % of the one or more monomer unit(s) of formula I.

(30) The method of any one of embodiments (18)-(29), wherein $R_2$ is an aliphatic chain selected from about 10 to about 20 carbon units in length or a combination thereof.

(31) The method of embodiment (30), wherein $R_2$ is an aliphatic chain of about 12 carbon units in length.

(32) The method of any one of embodiments (18)-(31), wherein each X can be the same or different and is independently an anion which comprises an element selected from the group consisting of a halogen, sulfur, carbon, silicon, boron, nitrogen, phosphorous, and combinations thereof.

(33) The method of embodiment (32), wherein each X can be the same or different and is independently a halogen selected from the group consisting of fluoride, chloride, bromide, and combinations thereof.

(34) The method of any one of embodiments (18)-(33), wherein the polymer is added to the pulp slurry upstream of a head box of the papermaking process.

(35) The method of embodiment (34), wherein the polymer is added to the pulp slurry upstream of a mixing chest of the papermaking process.

(36) The method of embodiment (35), wherein the polymer is added to recycled paper pulp of the papermaking process.

The following examples further illustrate the invention but, of course, should not be construed as in any way limiting its scope.

EXAMPLES

Table 1 provides the chemical composition and reduced specific viscosity ("RSV") for each of Polymers 1-9, which are the subjects of the experiments outlined in Examples 1-3.

TABLE 1

| Number | Polymer | RSV at 450 ppm and 30° C. |
|---|---|---|
| 1 (Comparative) | Epichlorhydrin-dimethylamine-ammonium terpolymer | 0.17 dL/g |
| 2 (Comparative) | Ethoxylated, propoxylated hexadecanol | N/A |
| 3 (Comparative) | 20 mol % DMAEA.MCQ + 80 mol % acrylamide copolymer | 12.00 dL/g |
| 4 (Inventive) | 2 mol % Dodecyldiquat* + 28 mol % methyldiquat* + 70 mol % acrylamide* terpolymer | 1.95 dL/g |
| 5 (Inventive) | 2 mol % Dodecyldiquat* + 68 mol % methyldiquat* + 30 mol % acrylamide* terpolymer | 1.94 dL/g |
| 6 (Inventive) | 2 mol % Dodecyldiquat* + 80 mol % DADMAC + 18 mol % acrylamide* terpolymer | 1.10 dL/g |
| 7 (Inventive) | 2 mol % Dodecyldiquat* + 68 mol % methyldiquat* + 30 mol % acrylamide* terpolymer | 0.58 dL/g |
| 8 (Comparative) | Glyoxylated 5 mol % DADMAC + 95 mol % acrylamide* copolymer | N/A |
| 9 (Inventive) | 2 mol % Dodecyldiquat* + 28 mol % methyldiquat* + 70 mol % acrylamide* terpolymer | 1.35 dL/g |

*For the purposes of Table 1, "dodecyldiquat" refers to $N^1$-dodecyl-2-hydroxy-$N^3$-(3-methacrylamidopropyl)-$N^1,N^1,N^3,N^3$-tetramethylpropane-1,3-diaminium chloride, "methyldiquat" refers to 2-hydroxy-$N^1$-(3-methacrylamidopropyl)-$N^1,N^1,N^3,N^3$,$N^3$-pentamethylpropane-1,3-diaminium chloride, and "acrylamide" refers to 2-propenamide.

Example 1

This example demonstrates the effect on pitch deposition, exhibited by a dispersive additive, as determined by the mass (lag) of pitch deposition as a function of time.

A 1000 mL 0.5 mol % softwood Kraft pulp slurry, which was pH pre-adjusted to 10.6, was placed in an SRM-3 instrument cell followed by addition of a dispersive additive (which comprised 5 ppm or 10 ppm of one of Polymers 1-7). After five minutes of agitation at 300 RPM, 100 mL of a 1 mol % solution of synthetic softwood pitch in isopropanol was added. The solution was homogenized and 8 mL of 0.5 mol % (as $Ca^{2+}$ ion) calcium chloride solution was added. The pitch deposition was recorded on an SRM-3 instrument for 20 to 25 minutes, at which time the pH was adjusted to 3.5 with 5 N hydrochloric acid. Pitch deposition was monitored for another 30 to 40 minutes. The mass ($\mu g/cm^2$) of pitch deposition was plotted as a function of time (FIG. 1). The "Control" data shown in FIG. 1 represents the SRM-3 data for a 1000 mL 0.5 mol % softwood Kraft pulp slurry which did not contain any dispersive agent.

The SRM-3 is a Nalco proprietary instrument based on quartz crystal microbalance technology described in U.S. Pat. No. 6,942,782 and *Appita*, 2011, 64, 25-29, which is used "in a non-electrochemical mode" as described in the procedure of the previous paragraph. SRM-3 can be described as a sensitive microcoupon that records mass deposition continuously in a benchtop batch experiment. In a series of benchtop tests, the samples are tested consecutively (i.e., first a control (blank), then slurry containing the product).

As is apparent from the results set forth in FIG. 1, dispersive additives comprising at least one diquat monomer unit (Polymers 4-6) outperformed the benchmark dispersive additives, comprising Polymers 1-3, commonly used for pitch deposition control. In addition, dispersive additives, comprising a polymer with two different diquat monomers (Polymers 4 and 5), provided low levels of pitch deposition (less than 6.5 $\mu g/cm^2$ over a span of one hour), outperforming all other dispersive additive polymers tested.

Example 2

This example demonstrates the effect on stickies deposition, exhibited by a dispersive additive, as determined by Nile red fluorescence reduction. The higher the fluorescence reduction percentile, the more stickies are fixed to the fibers, and thus, better stickies deposition control.

A refrigerated recycled pulp (OCC, 1.9 mol %) from a mill was gradually warmed to ambient temperature. A 150 g sample of the recycled pulp was placed in a plastic container, followed by addition of an intended fixative (comprising 95 ppm of one of Polymers 1, 3, 4, 5, and 7). The resulting slurry was agitated for 30 seconds by mechanic head agitation (800 RPM), and the agitated pulp was filtered through a 100 mesh filter. A 3 mL aliquot of the filtrate was placed in a cuvette and the fluorescence was measured as a background. To the cuvette was added 6 μL of Nile red solution, the cuvette was inverted several times to mix, and the fluorescence was measured again. The net fluorescence change was determined upon subtraction of the background value. In addition, a net fluorescence was obtained for a sample that did not contain a fixative ("Control").

The percentile of fluorescence reduction was determined by taking the difference between net fluorescence of the sample comprising an intended fixative and the Control, and dividing the obtained value by the net fluorescence of the Control. The percentile of fluorescence reduction is plotted in FIG. 2.

Figure 2:
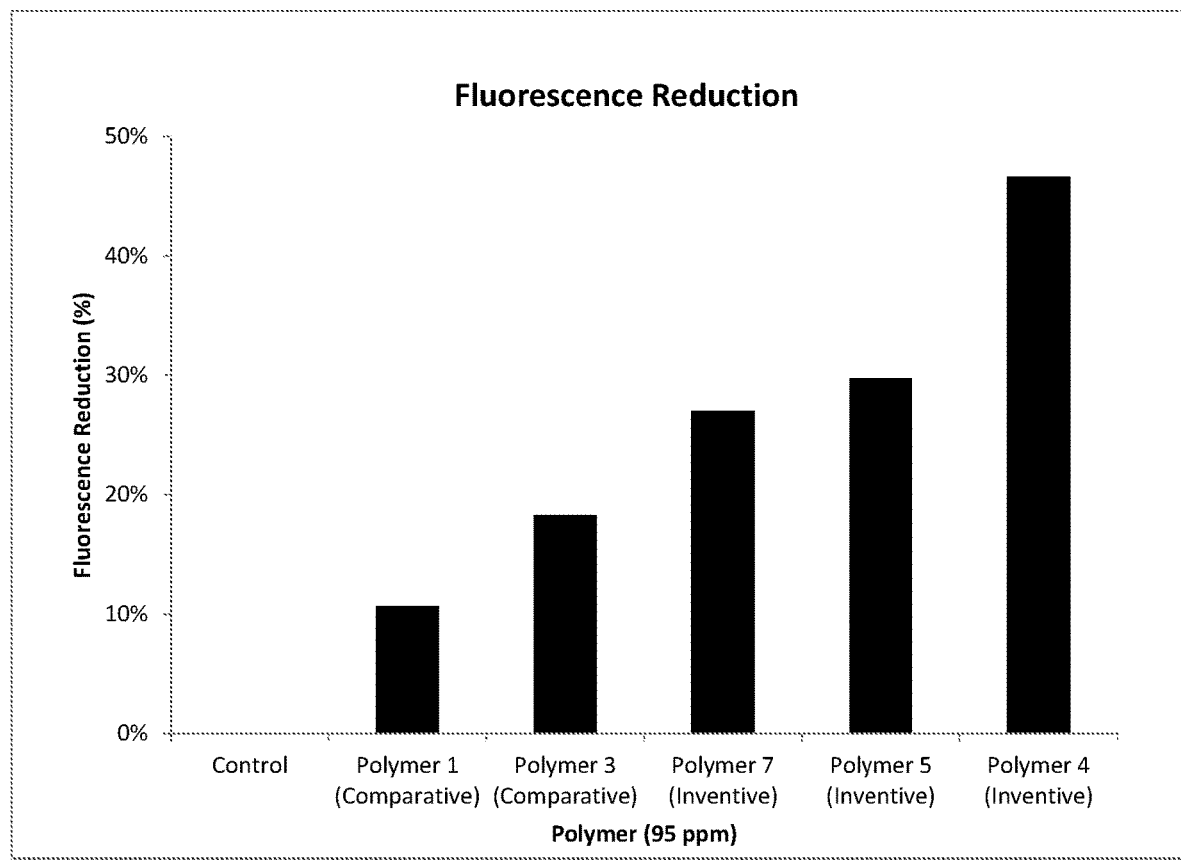
FIG. 2 illustrates stickies deposition as measured by Nile red fluorescence reduction for Example 2.

As is apparent from the results set forth in FIG. 2, fixative additives comprising two different diquat monomer units (Polymers 4, 5, and 7) outperformed the benchmark fixative additives, comprising Polymers 1 and 3, commonly used for stickies deposition control. In addition, fixative additive, comprising Polymer 4, provided the highest fluorescence reduction percent (46.6 mol %), outperforming all other fixative additives.

Example 3

Figure 3:
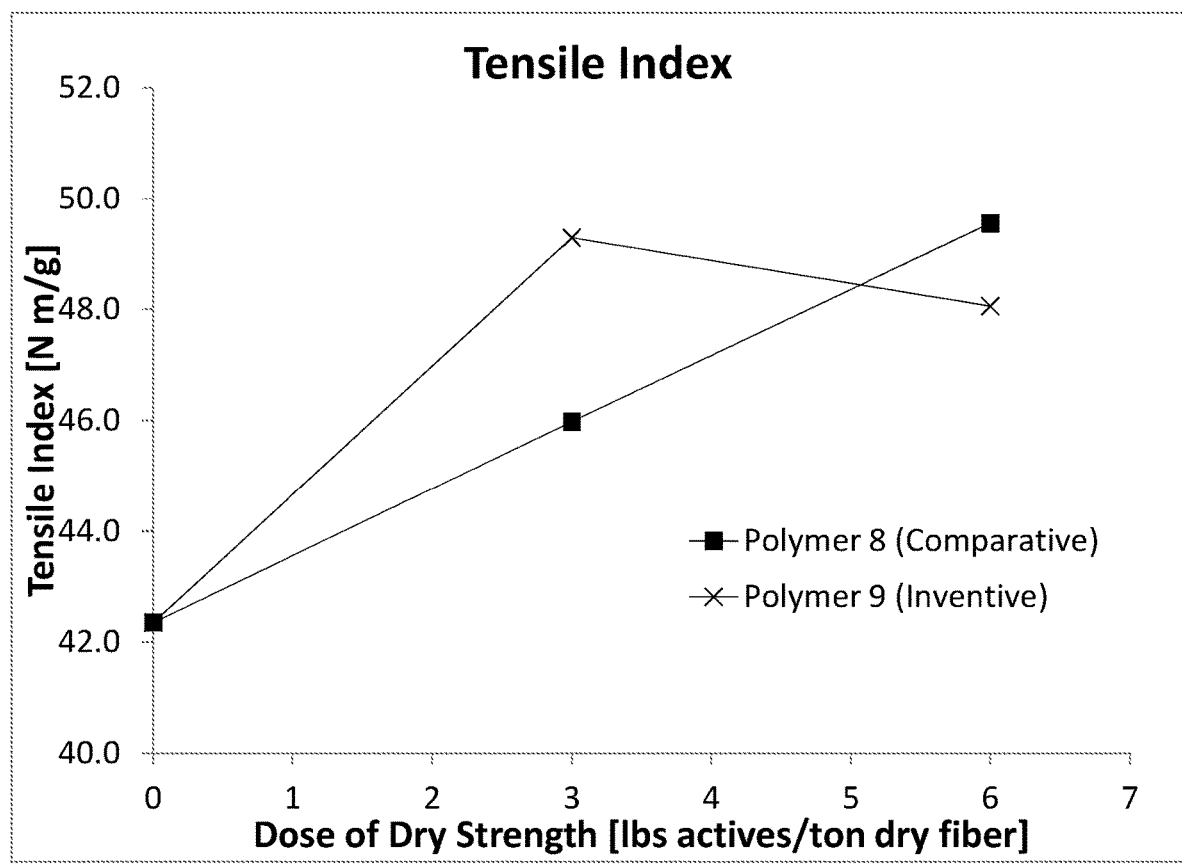
FIG. 3 illustrates tensile index as a function of dry strength dosage for Example 3.
Figure 4:
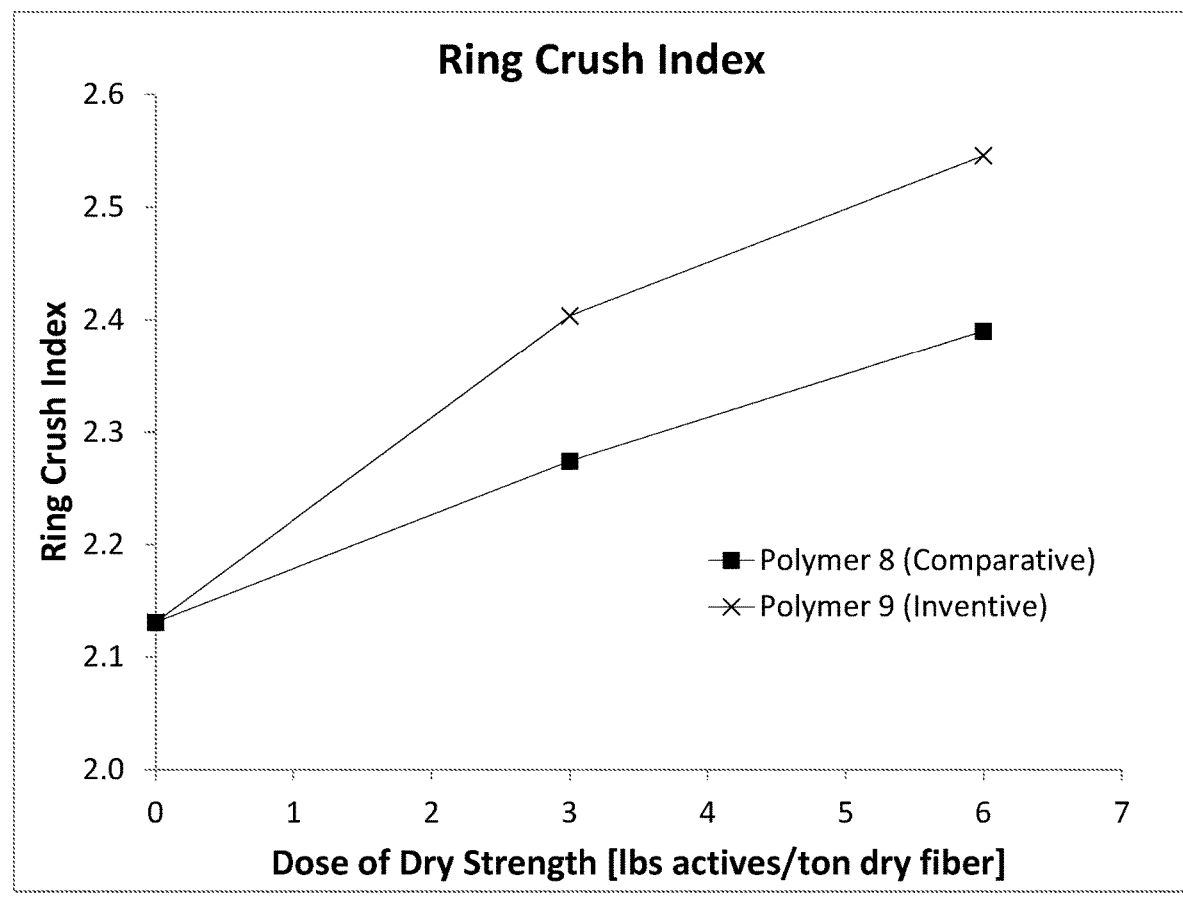
FIG. 4 illustrates ring crush index as a function of dry strength dosage for Example 3.
Figure 5:
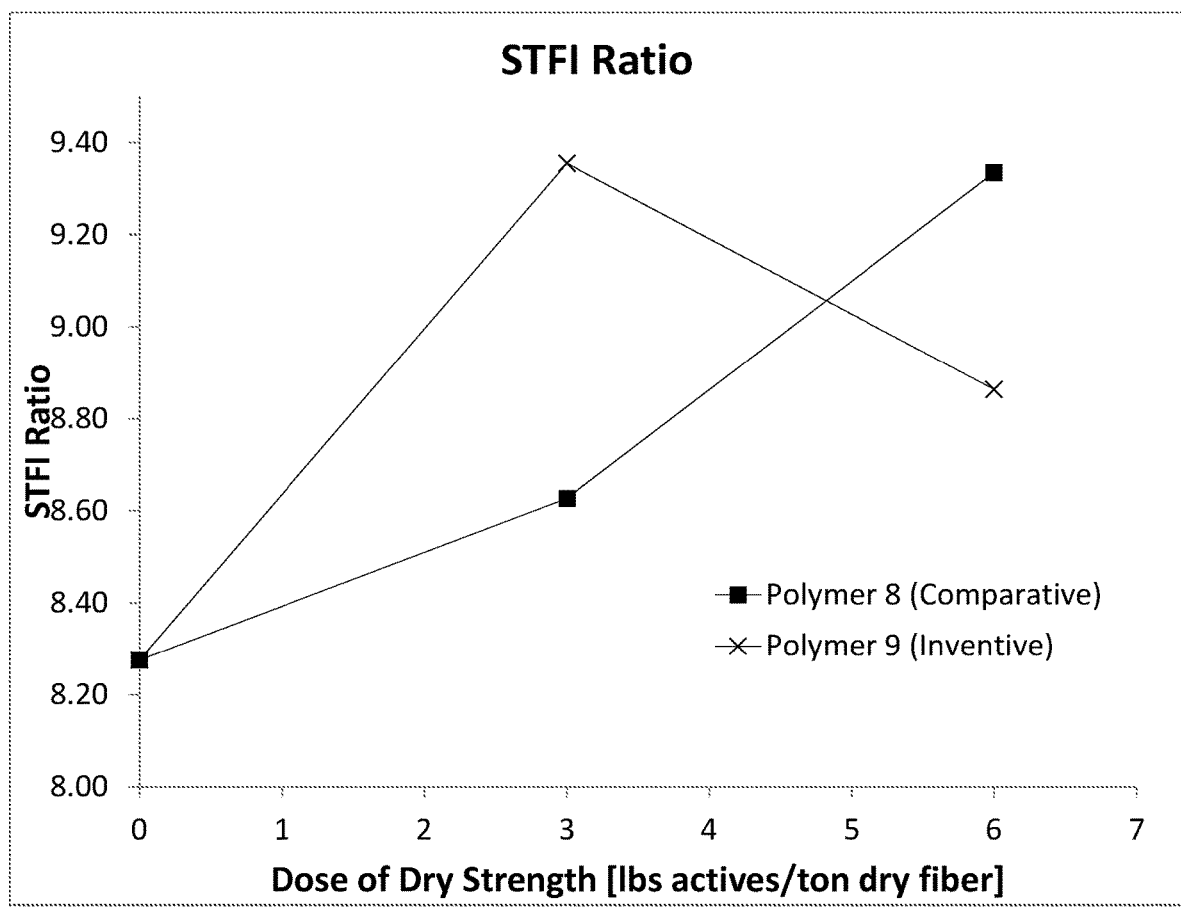
FIG. 5 illustrates STFI ratio as a function of dry strength dosage for Example 3.
Figure 6:
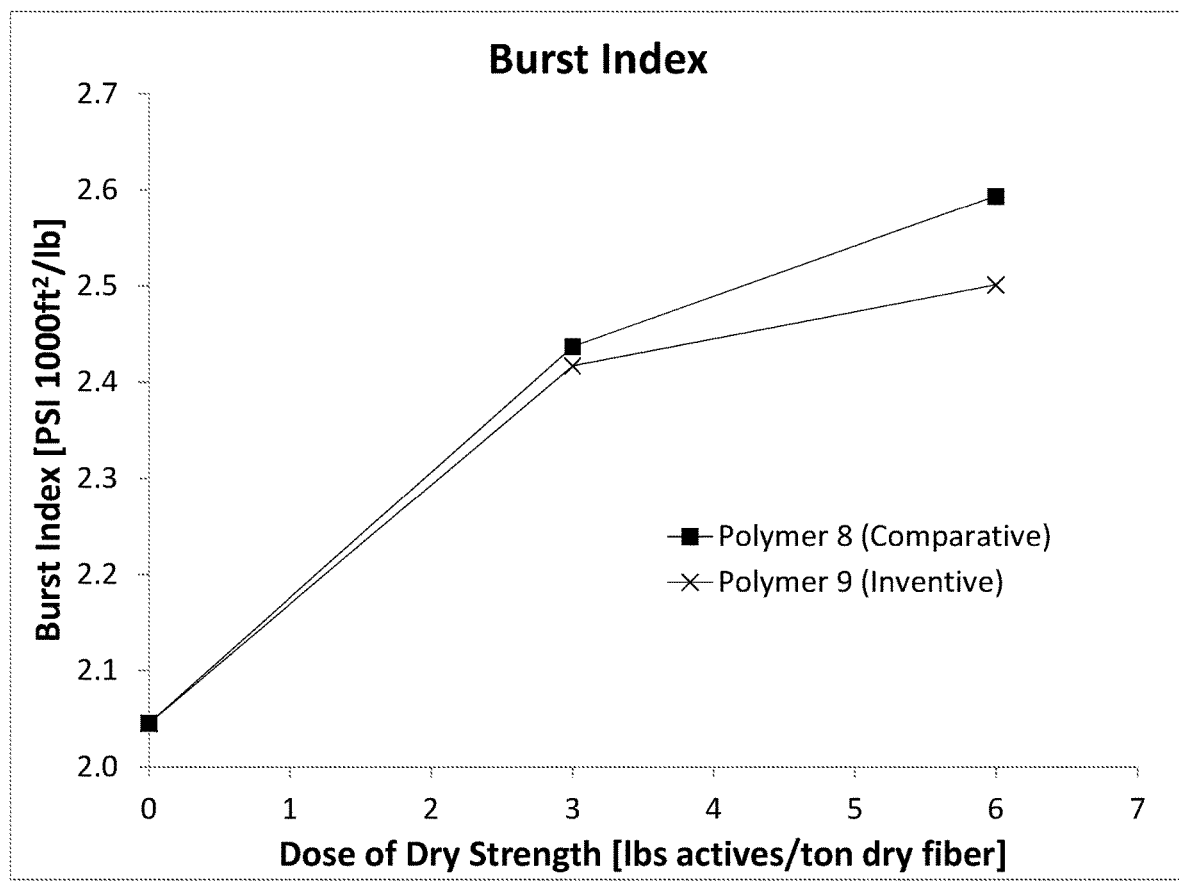
FIG. 6 illustrates burst index as a function of dry strength dosage for Example 3.

This example demonstrates the effect on paper dry strength, exhibited by a sheet of paper treated with a strength agent containing a diquat-based acrylamide polymer. The dry strength of the paper is assessed using the following four parameters: tensile index (FIG. 3), ring crush index (FIG. 4), STFI ratio (FIG. 5), and burst index (FIG. 6).

A 645 mL solution of paper furnish (OCC, 2.2 mol %) was treated with 0.5 lb/T flocculant and doses of 0, 3, and 6 lbs/T dry strength agent (Polymers 8 and 9). The treated fibers were then added to a handsheet mold and drained through a screen to form wet fiber pads. The handsheet was couched from the sheet mold by placing two blotters and a metal plate on the wet handsheet and roll-pressing with six passes of a 25 lb metal roller. The forming wire and top blotter were removed and the handsheet and blotter were placed on top of two new blotters. A metal plate was then placed facing the wire side of the handsheet. Five formed handsheets were stacked on top of one another in this manner (new blotter, blotter, formed handsheet, and plate) and placed in the handsheet press for five minutes at 0.565 MPa. The handsheet label was placed on the lower-right-wire side of the sheet and this side was in contact with the dryer surface. Sheets were dried at 220° C. for 90 seconds in a single pass. The handsheets were stored overnight at 50 mol % relative humidity and 23° C. prior to strength testing.

As demonstrated by FIGS. 3-6, dry strength agents comprising two different diquat monomer units (Polymers 9) outperformed a common strength agent (Polymer 8) in tensile index, ring crush index, and STFI ratio at a dosage of 3 lbs/ton. In addition, Polymer 9, at a dosage of 3 lbs/ton, produced a tensile index, ring crush index, and STFI ratio greater than or equal to Polymer 8 at a dosage of 6 lbs/ton. Comparative Polymer 8 and inventive Polymer 9 produced relatively similar burst index results at dosages of 3 and 6 lbs/ton.

Example 4

This example provides an exemplary experimental procedure for the synthesis of the multiquat polymers described herein.

To a reactor, was added 2-propenamide (39.815 g; 50.24% in $H_2O$), 2-hydroxy-$N^1$-(3-methacrylamidopropyl)-$N^1,N^1,N^3,N^3,N^3$-pentamethylpropane-1,3-diaminium chloride (68.150 g; 59.19% in $H_2O$), $N^1$-dodecyl-2-hydroxy-$N^3$-(3-methacrylamidopropyl)-$N^1,N^1,N^3,N^3$-tetramethylpropane-1,3-diaminium chloride (8.506 g; 48.46% in $H_2O$) and deionized water (175.837 g). The mixture was stirred, and pH was adjusted to 6.5 with diluted sulfuric acid (0.119 g; 1% in $H_2O$). The reaction mixture was purged at room temperature with nitrogen at 1 L/minute while agitating at 400 RPM. After 30 minutes, the reaction mixture was heated to about 50° C., followed by addition of 2,2'-azobis(2-amidinopropane) hydrochloride. The reaction continued for 6 hours at this temperature while deionized water (772.177 g) was added portion-wise during the 6 hour duration of the reaction to aid the agitation. The resulting terpolymer was directly used or diluted as needed for performance evaluation.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A polymer for use in papermaking comprising, one or more monomer unit(s) of formula I:

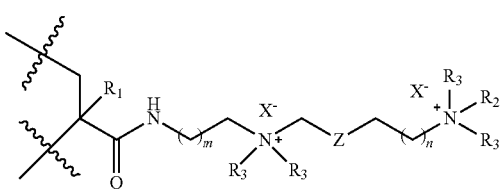

wherein each X is the same or different and is independently selected from an anion, $R_1$ is hydrogen or $C_1$-$C_9$ alkyl, $R_2$ is an aliphatic chain or a heteroaliphatic chain from about 10 to about 30 carbon units in length, each $R_3$ is the same or different and is independently selected from hydrogen, aryl, $C_1$-$C_9$ alkyl, and a combination thereof, Z is $CH_2$, CHOH, CHOR, or a combination thereof, wherein R is a substituent with one or more quanternized amine(s), m is an integer from 0 to 11, and n is an integer from 0 to 5;

one or more monomer unit(s) of formula II:

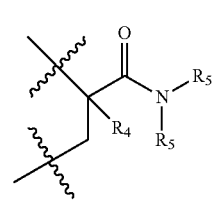

wherein $R_4$ is hydrogen or $C_1$-$C_9$ alkyl, and each $R_5$ is the same or different and is independently selected from hydrogen, aryl, $C_1$-$C_{10}$ aliphatic chain, $C_1$-$C_{10}$ heteroaliphatic chain, and a combination thereof; and one or more monomer unit(s) of formula III:

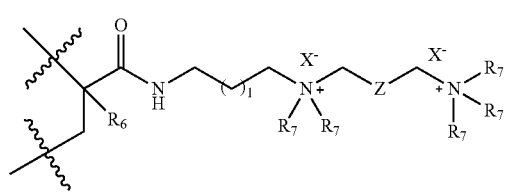

wherein each X is the same or different and is independently selected from an anion, $R_6$ is hydrogen or $C_1$-$C_9$ alkyl, Z is $CH_2$, CHOH, CHOR, or a combination thereof, wherein R is a substituent with one or more quanternized amine(s), and each $R_7$ is the same or different and is independently selected from hydrogen, aryl, $C_1$-$C_9$ alkyl, l is integer from 0 to 10, and a combination thereof.

2. The polymer of claim 1, comprising from about 0.1 mol % to about 80 mol % of the one or more monomer unit(s) of formula III.

3. The polymer of claim 2, comprising from about 20 mol % to about 60 mol % of the one or more monomer unit(s) of formula III.

4. The polymer of claim 3, comprising from about 20 mol % to about 40 mol % of the one or more monomer unit(s) of formula III.

5. The polymer of claim 1, wherein $R_2$ is an aliphatic chain selected from about 10 to about 20 carbon units in length or a combination thereof.

6. The polymer of claim 1, wherein each X is the same or different and is independently an anion which comprises an element selected from the group consisting of a halogen, sulfur, carbon, silicon, boron, nitrogen, phosphorous, and combinations thereof.

7. The polymer of claim 1, wherein each X is the same or different and is independently a halogen selected from the group consisting of fluoride, chloride, bromide, iodide, and combinations thereof.

8. A polymer for use in papermaking comprising,
one or more monomer unit(s) of formula I:

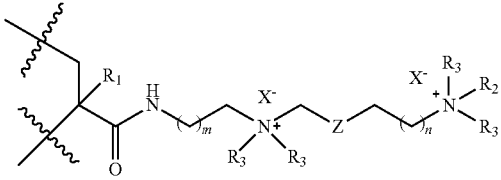

wherein each X is the same or different and is independently selected from an anion, $R_1$ is hydrogen or $C_1$-$C_9$ alkyl, $R_2$ is an aliphatic chain or a heteroaliphatic chain from about 10 to about 30 carbon units in length, each $R_3$ is the same or different and is independently selected from hydrogen, aryl, $C_1$-$C_9$ alkyl, and a combination thereof, Z is $CH_2$, CHOH, CHOR, or a combination thereof, wherein R is a substituent with one or more quanternized amine(s), m is an integer from 0 to 11, and n is an integer from 0 to 5;
one or more monomer unit(s) of formula II:

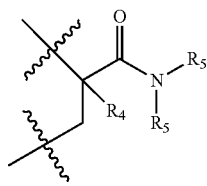

wherein $R_4$ is hydrogen or $C_1$-$C_9$ alkyl, and each $R_5$ is the same or different and is independently selected from hydrogen, aryl, $C_1$-$C_{10}$ aliphatic chain, $C_1$-$C_{10}$ heteroaliphatic chain, and a combination thereof; and
one or more additional monomer unit(s) selected from 2-(dimethylamino)ethyl acrylate ("DMAEA"), 2-(dimethylamino)ethyl methacrylate ("DMAEM"), 3-(dimethylamino)propyl methacrylamide ("DMAPMA"), 3-(dimethylamino)propyl acrylamide ("DMAPA"), 3-methacrylamidopropyl-trimethyl-ammonium chloride ("MAPTAC"), 3-acrylamidopropyl-trimethyl-ammonium chloride ("APTAC"), N-vinyl pyrrolidone ("NVP"), diallyldimethylammonium chloride ("DADMAC"), diallylamine, vinylformamide, 2-(acryloyloxy)-N,N,N-trimethylethanaminium chloride ("DMAEA.MCQ"), 2-(methacryloyloxy)-N,N,N-trimethylethanaminium chloride ("DMAEM.MCQ"), N,N-dimethylaminoethyl acrylate benzyl chloride ("DMAEA.BCQ"), N,N-dimethylaminoethyl methacrylate benzyl chloride ("DMAEM.BCQ"), 2-acrylamido-2-methylpropane sulfonic acid ("AMPS"), 2-acrylamido-2-methylbutane sulfonic acid ("AMBS"), [2-methyl-2-[(1-oxo-2-propenyl)amino]propyl]-phosphonic acid, (meth)acrylic acid, salts thereof, and combinations thereof.

9. The polymer of claim 8, wherein the one or more additional monomer unit(s) is a cationic monomer unit selected from diallyldimethylammonium chloride ("DADMAC"), 2-(acryloyloxy)-N,N,N-trimethylethanaminium chloride ("DMAEA.MCQ"), 2-(methacryloyloxy)-N,N,N-trimethylethanaminium chloride ("DMAEM.MCQ"), N,N-dimethylaminoethyl acrylate benzyl chloride ("DMAEA.BCQ"), N,N-dimethylaminoethyl methacrylate benzyl chloride ("DMAEM.BCQ"), 3-methacrylamidopropyl-trimethyl-ammonium chloride ("MAPTAC"), and 3-acrylamidopropyl-trimethyl-ammonium chloride ("APTAC").

10. The polymer of claim 9, wherein the one or more additional monomer unit(s) is diallyldimethylammonium chloride ("DADMAC").

11. The polymer of claim 9, comprising from about 50 mol % to about 90 mol % of the one or more additional monomer unit(s).

12. A method of controlling pitch and stickies deposition in papermaking process, comprising treating pulp slurry with a polymer comprising,
one or more monomer unit(s) of formula I:

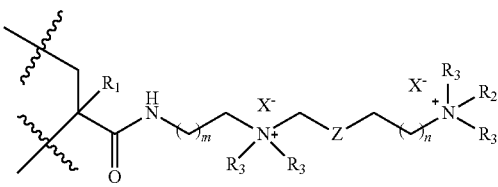

wherein each X is the same or different and is independently selected from an anion, $R_1$ is hydrogen or $C_1$-$C_9$ alkyl, $R_2$ is an aliphatic chain or a heteroaliphatic chain from about 10 to about 30 carbon units in length, each $R_3$ is the same or different and is independently selected from hydrogen, aryl, $C_1$-$C_9$ alkyl, and a combination thereof, Z is $CH_2$, CHOH, CHOR, or a combination thereof, wherein R is a substituent with one or more quanternized amine(s), m is an integer from 0 to 11, and n is an integer from 0 to 5;
one or more monomer unit(s) of formula II:

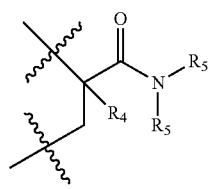

wherein $R_4$ is hydrogen or $C_1$-$C_9$ alkyl, and each $R_5$ is the same or different and is independently selected from hydrogen, aryl, $C_1$-$C_{10}$ aliphatic chain, $C_1$-$C_{10}$ heteroaliphatic chain, or a combination thereof; and
one or more additional monomer unit(s) selected from 2-(dimethylamino)ethyl acrylate ("DMAEA"), 2-(dimethylamino)ethyl methacrylate ("DMAEM"), 3-(dimethylamino)propyl methacrylamide ("DMAPMA"), 3-(dimethylamino)propyl acrylamide ("DMAPA"), 3-methacrylamidopropyl-trimethyl-ammonium chloride ("MAPTAC"), 3-acrylamidopropyl-trimethyl-ammonium chloride ("APTAC"), N-vinyl pyrrolidone ("NVP"), diallyldimethylammonium chloride ("DADMAC"), diallylamine, vinylformamide, 2-(acryloyloxy)-N,N,N-trimethylethanaminium chloride ("DMAEA.MCQ"), 2-(methacryloyloxy)-N,N,N-trimethylethanaminium chloride ("DMAEM.MCQ"), N,N-dimethylaminoethyl acrylate benzyl chloride ("DMAEA.BCQ"), N,N-dimethylaminoethyl methacrylate benzyl chloride ("DMAEM.BCQ"), 2-acrylamido-2-methylpropane sulfonic acid ("AMPS"), 2-acrylamido-2-methylbutane sulfonic acid ("AMBS"), [2-methyl-2-[(1-oxo-2-propenyl)amino]propyl]-phosphonic acid, (meth)acrylic acid, one or more monomer unit(s) of formula III:

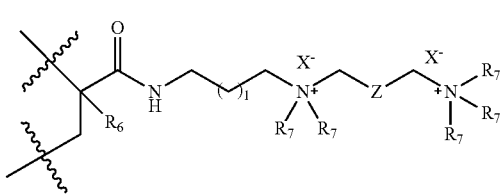

wherein each X is the same or different and is independently selected from an anion, $R_6$ is hydrogen or $C_1$-$C_9$ alkyl, 1 is integer from 0 to 10, Z is $CH_2$, CHOH, CHOR, or a combination thereof, wherein R is a substituent with one or more quanternized amine(s), and each $R_7$ is the same or different and is independently selected from hydrogen, aryl, $C_1$-$C_9$ alkyl, and a combination thereof, salts thereof, and a combination thereof.

13. The method of claim 12, wherein the one or more additional monomer unit(s) is a cationic monomer unit selected from diallyldimethylammonium chloride ("DADMAC"), 2-(acryloyloxy)-N,N,N-trimethylethanaminium chloride ("DMAEA.MCQ"), 2-(methacryloyloxy)-N,N,N-trimethylethanaminium chloride ("DMAEM.MCQ"), N,N-dimethylaminoethyl acrylate benzyl chloride ("DMAEA.BCQ"), N,N-dimethylaminoethyl methacrylate benzyl chloride ("DMAEM.BCQ"), and 3-methacrylamidopropyl-trimethyl-ammonium chloride ("MAPTAC"), 3-acrylamidopropyl-trimethyl-ammonium chloride ("APTAC"), one or more monomer unit(s) of formula III:

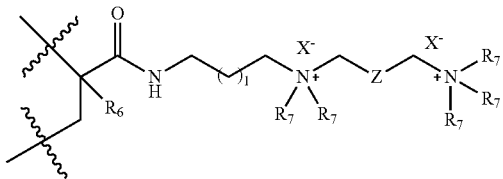

wherein each X is the same or different and is independently selected from an anion, $R_6$ is hydrogen or $C_1$-$C_9$ alkyl, 1 is integer from 0 to 10, Z is $CH_2$, CHOH, CHOR, or a combination thereof, wherein R is a substituent with one or more quanternized amine(s), and each $R_7$ is the same or different and is independently selected from hydrogen, aryl, $C_1$-$C_9$ alkyl, and a combination thereof, salts thereof, and a combination thereof.

14. The method of claim 13, wherein the one or more additional monomer unit(s) is a monomer unit of formula III or diallyldimethylammonium chloride ("DADMAC").

15. The method of claim 12, wherein $R_2$ is an aliphatic chain selected from about 10 to about 20 carbon units in length or a combination thereof.

16. The method of claim 12, wherein each X is the same or different and is independently an anion which comprises an element selected from the group consisting of a halogen, sulfur, carbon, silicon, boron, nitrogen, phosphorous, and combinations thereof.

17. The method of claim 12, wherein each X is the same or different and is independently a halogen selected from the group consisting of fluoride, chloride, bromide, and combinations thereof.

18. The method of claim 12, wherein the polymer is added to the pulp slurry upstream of a head box of the papermaking process.

19. The method of claim 12, wherein the polymer is added to the pulp slurry upstream of a mixing chest of the papermaking process.

20. The method of claim 12, wherein the polymer is added to recycled paper pulp of the papermaking process.

* * * * *

UNITED STATES PATENT AND TRADEMARK OFFICE
CERTIFICATE OF CORRECTION

PATENT NO. : 10,519,602 B2  
APPLICATION NO. : 16/008589  
DATED : December 31, 2019  
INVENTOR(S) : Li et al.

Page 1 of 1

It is certified that error appears in the above-identified patent and that said Letters Patent is hereby corrected as shown below:

In the Claims

At Column 28, Claim 1, Line 6, delete "$CH_2$ , CHOH," and insert --$CH_2$, CHOH,--

Signed and Sealed this  
Twenty-fifth Day of February, 2020

Andrei Iancu  
*Director of the United States Patent and Trademark Office*